United States Patent
Shindo et al.

(10) Patent No.: US 11,636,294 B2
(45) Date of Patent: Apr. 25, 2023

(54) IMAGE FORMING APPARATUS, CONTROL METHOD THEREOF, AND STORAGE MEDIUM

(71) Applicant: CANON KABUSHIKI KAISHA, Tokyo (JP)

(72) Inventors: Yukihiro Shindo, Chiba (JP); Hidekazu Nakashio, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/491,431

(22) Filed: Sep. 30, 2021

(65) Prior Publication Data
US 2022/0114408 A1 Apr. 14, 2022

(30) Foreign Application Priority Data
Oct. 8, 2020 (JP) .............................. JP2020-170576

(51) Int. Cl.
*G06K 15/02* (2006.01)
*G06K 15/00* (2006.01)

(52) U.S. Cl.
CPC ......... *G06K 15/027* (2013.01); *G06K 15/002* (2013.01); *G06K 15/1809* (2013.01); *G06K 15/1878* (2013.01)

(58) Field of Classification Search
CPC .............. G06K 15/027; G06K 15/002; G06K 15/1809; G06K 15/1878
USPC ........................................ 358/1.9, 1.15, 2.1
See application file for complete search history.

(56) References Cited

U.S. PATENT DOCUMENTS

| | | | |
|---|---|---|---|
| 2003/0002096 A1* | 1/2003 | Sugiyama | H04N 1/6033 358/518 |
| 2013/0120774 A1* | 5/2013 | Kouguchi | G06K 15/188 358/1.9 |
| 2015/0172479 A1* | 6/2015 | Sano | H04N 1/0044 358/1.15 |

FOREIGN PATENT DOCUMENTS

JP 2004-153667 5/2004

* cited by examiner

*Primary Examiner* — Quang N Vo
(74) *Attorney, Agent, or Firm* — Venable LLP

(57) ABSTRACT

An object is to match the texture of a printed material, in addition to the tint, between different printing devices. In order to implement this object, a printed material output by a destination device is scanned and whether a certain area in image data obtained by the scan is an area printed in K color on the printed material or an area printed in CMY color mixture is determined. Then, based on the determination results, a printing parameter is determined.

11 Claims, 17 Drawing Sheets

| R | G | B | C | M | Y | K |
|---|---|---|---|---|---|---|
| 0 | 0 | 0 | 0 | 0 | 0 | 255 |
| 0 | 0 | 255 | 255 | 255 | 0 | 0 |
| 0 | 255 | 0 | 255 | 0 | 255 | 0 |
| 0 | 255 | 255 | 255 | 0 | 0 | 0 |
| 255 | 0 | 0 | 0 | 255 | 255 | 0 |
| 255 | 0 | 255 | 0 | 255 | 0 | 0 |
| 255 | 255 | 0 | 0 | 0 | 255 | 0 |
| 255 | 255 | 255 | 0 | 0 | 0 | 0 |

| R | G | B | $L^*$ | $a^*$ | $b^*$ |
|---|---|---|---|---|---|
| 0 | 0 | 0 | 16.37 | 0.30 | 0.06 |
| 0 | 0 | 255 | 26.19 | 8.98 | -40.48 |
| 0 | 255 | 0 | 51.93 | -46.02 | 39.40 |
| 0 | 255 | 255 | 60.01 | -28.96 | -24.63 |
| 255 | 0 | 0 | 40.01 | 65.37 | 49.68 |
| 255 | 0 | 255 | 49.97 | 60.86 | -2.80 |
| 255 | 255 | 0 | 87.62 | -5.48 | 92.33 |
| 255 | 255 | 255 | 100.00 | 0.00 | 0.00 |

| index | R | G | B | C | M | Y | K | L* | a* | b* |
|---|---|---|---|---|---|---|---|---|---|---|
| 0 | 0 | 0 | 0 | 0 | 0 | 0 | 0 | 100 | 0 | 0 |
| 1 | 17 | 17 | 17 | 10 | 10 | 10 | 0 | 93.33 | 0 | 0 |
| 2 | 34 | 34 | 34 | 20 | 20 | 20 | 0 | 86.67 | 0 | 0 |
| 3 | 51 | 51 | 51 | 30 | 30 | 30 | 0 | 80 | 0 | 0 |
| 4 | 68 | 68 | 68 | 40 | 40 | 40 | 0 | 73.33 | 0 | 0 |
| 5 | 85 | 85 | 85 | 50 | 50 | 50 | 0 | 66.67 | 0 | 0 |
| 6 | 102 | 102 | 102 | 60 | 60 | 60 | 0 | 60 | 0 | 0 |
| 7 | 119 | 119 | 119 | 70 | 70 | 70 | 0 | 53.33 | 0 | 0 |
| 8 | 136 | 136 | 136 | 80 | 80 | 80 | 0 | 46.67 | 0 | 0 |
| 9 | 153 | 153 | 153 | 90 | 90 | 90 | 0 | 40 | 0 | 0 |
| 10 | 170 | 170 | 170 | 100 | 100 | 100 | 20 | 33.33 | 0 | 0 |
| 11 | 187 | 187 | 187 | 100 | 100 | 100 | 50 | 26.67 | 0 | 0 |
| 12 | 204 | 204 | 204 | 100 | 100 | 100 | 100 | 20 | 0 | 0 |
| 13 | 221 | 221 | 221 | 100 | 100 | 100 | 150 | 13.33 | 0 | 0 |
| 14 | 238 | 238 | 238 | 100 | 100 | 100 | 200 | 6.67 | 0 | 0 |
| 15 | 255 | 255 | 255 | 100 | 100 | 100 | 255 | 0 | 0 | 0 |

FIG.7A

| index | R | G | B | C | M | Y | K | L* | a* | b* |
|---|---|---|---|---|---|---|---|---|---|---|
| 0 | 0 | 0 | 0 | 0 | 0 | 0 | 0 | 100 | 0 | 0 |
| 1 | 17 | 17 | 17 | 0 | 0 | 0 | 17 | 93.33 | 0 | 0 |
| 2 | 34 | 34 | 34 | 0 | 0 | 0 | 34 | 86.67 | 0 | 0 |
| 3 | 51 | 51 | 51 | 0 | 0 | 0 | 51 | 80 | 0 | 0 |
| 4 | 68 | 68 | 68 | 0 | 0 | 0 | 68 | 73.33 | 0 | 0 |
| 5 | 85 | 85 | 85 | 0 | 0 | 0 | 85 | 66.67 | 0 | 0 |
| 6 | 102 | 102 | 102 | 0 | 0 | 0 | 102 | 60 | 0 | 0 |
| 7 | 119 | 119 | 119 | 0 | 0 | 0 | 119 | 53.33 | 0 | 0 |
| 8 | 136 | 136 | 136 | 0 | 0 | 0 | 136 | 46.67 | 0 | 0 |
| 9 | 153 | 153 | 153 | 0 | 0 | 0 | 153 | 40 | 0 | 0 |
| 10 | 170 | 170 | 170 | 0 | 0 | 0 | 170 | 33.33 | 0 | 0 |
| 11 | 187 | 187 | 187 | 0 | 0 | 0 | 187 | 26.67 | 0 | 0 |
| 12 | 204 | 204 | 204 | 0 | 0 | 0 | 204 | 20 | 0 | 0 |
| 13 | 221 | 221 | 221 | 0 | 0 | 0 | 221 | 13.33 | 0 | 0 |
| 14 | 238 | 238 | 238 | 0 | 0 | 0 | 238 | 6.67 | 0 | 0 |
| 15 | 255 | 255 | 255 | 0 | 0 | 0 | 255 | 0 | 0 | 0 |

Print job of image attribute

Job attribute definition portion:
Paper type of first page of physical page:Plain paper Drawing information definition portion:
First page of logical page
  Drawing of first patch of logical page:Image
  Drawing of second patch of logical page:Image
  . . .
  Drawing of 729th patch of logical page:Image

FIG.13B

Print job of graphics attribute

Job attribute definition portion:
Paper type of first page of physical page:Plain paper Drawing information definition portion:
First page of logical page
  Drawing of first patch of logical page:Graphics
  Drawing of second patch of logical page:Graphics
  . . .
  Drawing of 729th patch of logical page:Graphics

FIG.13C

Print job of text attribute

Job attribute definition portion:
Paper type of first page of physical page:Plain paper Drawing information definition portion:
First page of logical page
  Drawing of first patch of logical page:Text
  Drawing of second patch of logical page:Text
  . . .
  Drawing of 729th patch of logical page:Text

IMAGE FORMING APPARATUS, CONTROL METHOD THEREOF, AND STORAGE MEDIUM

BACKGROUND

Field

The technique of the present disclosure relates to a color adjustment technique in an image forming apparatus that prints digital image data.

Description of the Related Art

In a case where an image forming apparatus capable of so-called full-color printing is replaced with another, or in a case where a new image forming apparatus is purchased, there is a demand to keep the tint of a printed material before the replacement or by the existing image forming apparatus also in the replaced or purchased image forming apparatus. Here, the printing device that is the destination, such as the image forming apparatus before the replacement and the existing image forming apparatus, is called "destination device" and the printing device that is adjusted, such as the replaced image forming apparatus and the newly purchased image forming apparatus, is called "adjustment device". Then, conventionally, a technique has been proposed that matches the tint of a printed material between different devices by adjusting the color profile. For example, Japanese Patent Laid-Open No. 2004-153667 has disclosed a color proof system that matches the tint of a printed material of an inexpensive color printer as an adjustment device with the tint of a printed material by a large-size proofreading apparatus as a destination device.

In a case where the color of an object (text, graphics, photo and the like) within a printing-target image is, for example, gray, it is possible to represent the color in CMYK (process color) or K color. However, the texture of a completed printed material is different depending on whether the color is represented in mixed color of four of CMYK or K color (configuration of number of color components of gray).

Further, there is a possibility that the above-described configuration of number of color components has been changed for each object attribute, such as text, graphics, and image, in the destination device. That is, in a case where not only the tint but also the texture is matched in the adjustment device, it is necessary to ascertain which configuration of number of color components is adopted, whether the configuration has been changed for each object attribute, and so on at the time of representing a certain color in the destination device. As regards this point, with the conventional technique to match the tint of a printed material between difference devices by adjusting the color profile, it is not possible to match both the tint and the texture.

SUMMARY

The image forming apparatus according to the present disclosure includes: a scan unit configured to scan a printed material; a first determination unit configured to determine whether a certain area in image data obtained by a scan is an area printed in K color on the printed material or an area printed in CMY color mixture; and a second determination unit configured to determine a printing parameter based on results determined by the first determination unit.

Further features of the present disclosure will become apparent from the following description of exemplary embodiments with reference to the attached drawings.

BRIEF DESCRIPTION I/F THE DRAWINGS

FIG. 7A is a diagram showing an example of a color conversion LUT for mixed gray and FIG. 7B is a diagram showing an example of a color conversion LUT for non-mixed gray;

FIG. 13A to FIG. 13C are each a diagram showing an example of a print job that gives instructions to print a target chart for each object attribute;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

In the present embodiment, an aspect is explained in which: first, the configuration of number of color components of gray is determined by scanning a gray patch on a printed material (color chart) output by a destination device and analyzing obtained image data; then, in accordance with determination results, color conversion parameters for an adjustment device are determined, whose configuration of number of color components of gray is made the same as that of the destination device; and printing processing is performed by performing color conversion processing using the color conversion parameters in the adjustment device. As the printing device of the present embodiment, an electrophotographic color image forming apparatus that forms an image on a sheet, in which toner images of four colors of CMYK are superimposed, is supposed, but the printing device may be an image forming apparatus adopting another printing method, such as the ink jet method.

<Configuration of Printing System>

Figure 1:
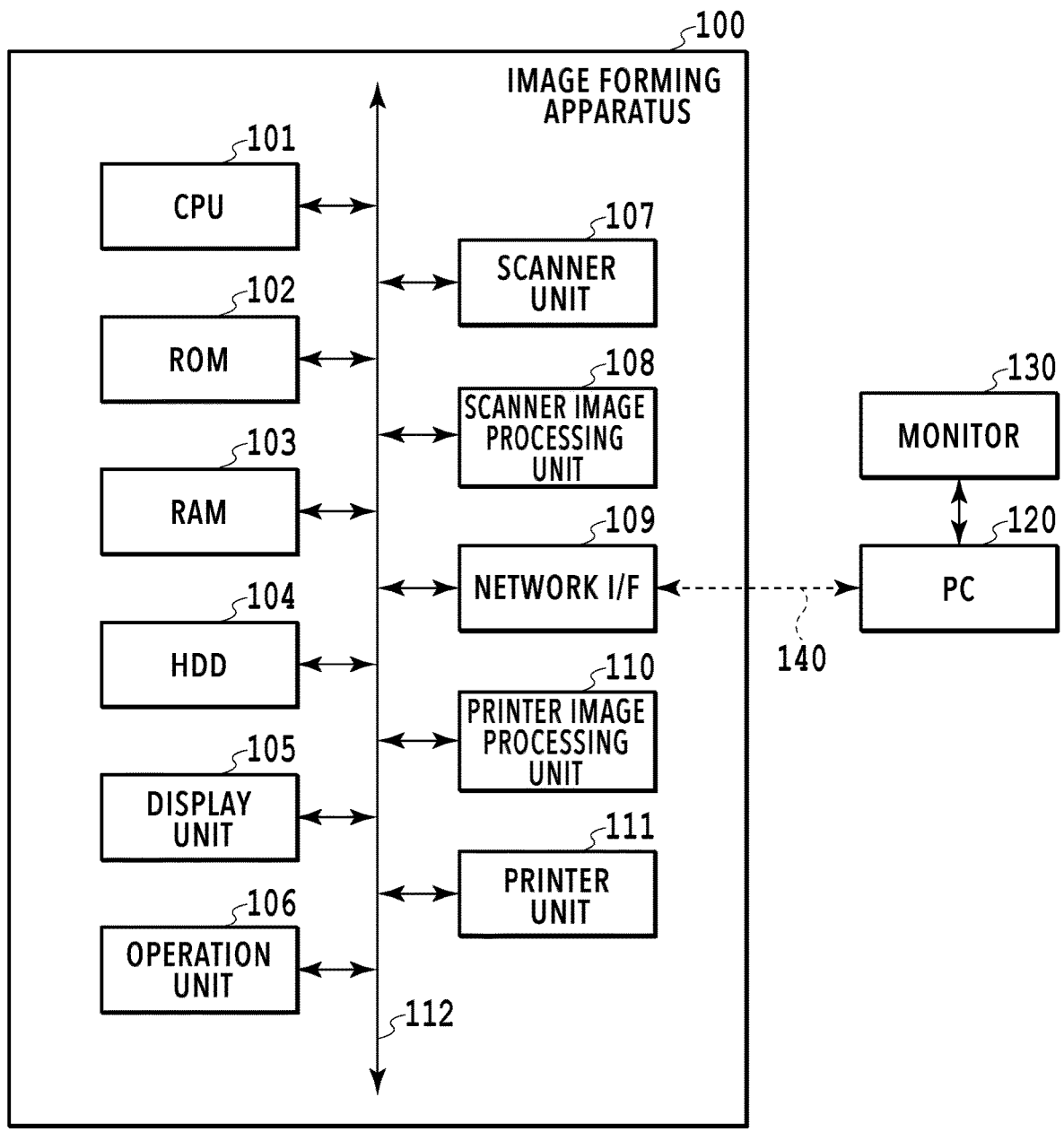
FIG. 1 is a diagram showing an example of a configuration of a printing system.

FIG. 1 is a diagram showing an example of the configuration of a printing system according to the present embodiment. An image forming apparatus 100 is connected with a PC (Personal Computer) 120 via a network 140. The network 140 is, for example, a LAN, WAN and the like.

In the PC 120, in addition to applications that perform document creation and table creation, a print driver is installed. In a case where digital image data crated by an arbitrary application is printed, a user converts the digital image data into PDL (Page Description Language) data by the printer driver and transmits a print job including the PDL data to the image forming apparatus 100 via the network 140. Further, to the PC 120, a monitor 130 is connected and the monitor 130 displays digital image data created by various applications, and so on.

As the image forming apparatus 100, mention is made of, for example, a device, such as a digital copy machine, a laser printer for which a scanner is prepared separately, and a facsimile. The image forming apparatus 100 includes a CPU 101, a ROM 102, a RAM 103, an HDD 104, a display unit 105, an operation unit 106, a scanner unit 107, a scanner image processing unit 108, a network I/F 109, a printer image processing unit 110, a printer unit 111, a system bus 112, a monitor 113, and a computer 114. In the following, each unit of the image forming apparatus 100 is explained.

The CPU 101 is a central processing unit that performs control of the entire apparatus, operation processing and the like and performs each piece of image processing, to be described later, based on programs stored in the ROM 102. The ROM 102 is a read-only memory and a storage area of the system activation program, programs for controlling the scanner unit 107 and the printer unit 111, character data, character code information and the like. The RAM 103 is a random access memory and made use of in a case where programs and data stored in the ROM 102 are loaded by the CPU 101 and executed for each piece of various kinds of processing. Further, the RAM 103 is made use of as a data storage area of an image file received from the scanner unit 107 or the network I/F 109. The HDD 104 consists of, for example, a hard disk and the like and is made use of for storage of results of processing performed by the CPU 101, each information file, and various kinds of data of a printing-target image and a chart image. Further, the HDD 104 is also made use of as a work area in a case where the CPU 101 performs processing. The display unit 105 displays a screen on, for example, a liquid crystal display, and is used for the display of the setting state of the apparatus, the processing of each unit of the apparatus, such as the CPU 101, the error state and the like. The operation unit 106 is a unit via which a user inputs various instructions to perform various kinds of processing, to change the setting, and so on. The information on the user instructions that are input via the operation unit 106 is stored in the RAM 103 and used in a case where the processing of the CPU 101 is performed. The scanner unit 107 irradiates a document placed on a document table, not shown schematically, converts the reflected light into an electric signal with a CCD or the like including color filters of RGB, and obtains RGB image data corresponding to the document. Further, the scanner unit 107 transmits this RGB image data to the scanner image processing unit 108. The scanner image processing unit 108 performs image processing, such as shading processing, for the RGB image data obtained by the scanner unit 107. The network I/F 109 is an interface for connecting the image forming apparatus 100 to a network, such as an intranet. Via this network I/F 109, a print job is input from the PC 120 over a network. The printer image processing unit 110 performs image processing appropriate to the printer unit 111 for the RGB image data for which image processing has been performed by the scanner image processing unit 108, or PDL data within the print job received via the network I/F 109. The printer unit 111 forms an image of CMYK image data including four colors of cyan, magenta, yellow, and black, which has been processed by the printer image processing unit 110, by performing each electrophotographic process of exposure, latent image formation, development, transfer, and fixing. The system bus 112 connects each unit described above to one another and serves as a data path between each unit.

<Details of Image Processing Unit>

Figure 2:
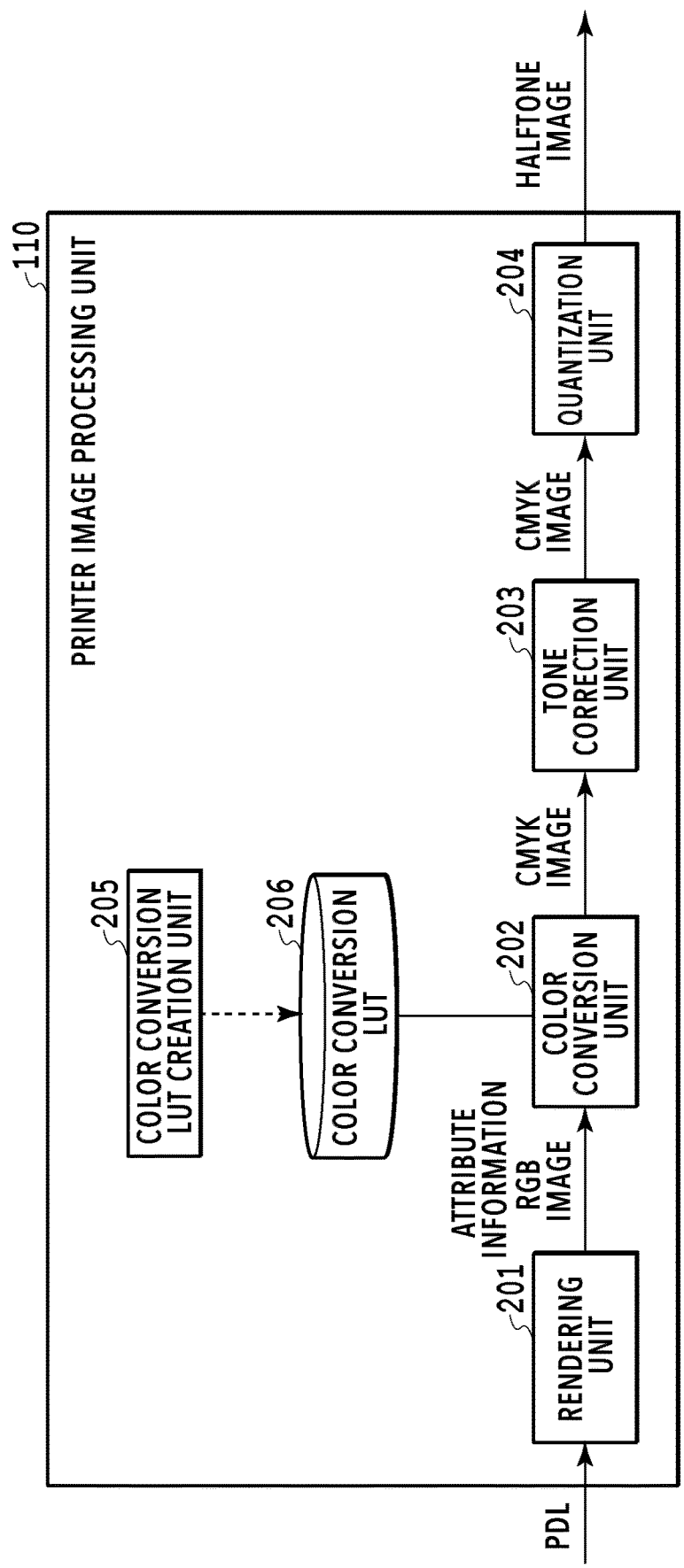
FIG. 2 is a diagram showing an example of a configuration of a printer image processing unit.

FIG. 2 is a block diagram showing the internal configuration of the printer image processing unit 110 according to the present embodiment, that is, functions relating to the image processing for generating print data from PDL data within a print data. The printer image processing unit 110 has a rendering unit 201, a color conversion unit 202, a tone correction unit (gamma correction unit) 203, a quantization unit 204, and a color conversion LUT creation unit 205. "LUT" is an abbreviation of a lookup table and stores input values and output values in association with each other at a plurality of discrete points (corresponding to grid points, to be described later) within a color space. In the following, each function block is explained.

The rendering unit 201 interprets the PDL data included in the print job received from the PC 110 with a PDL interpreter and converts the PDL data into bitmap data for printing. This bitmap data has a plurality of color components per pixel. Here, the plurality of color components refers to, in a case of the present embodiment, independent color components of R (red), G (green), and B (blue) defined in the sRGB color space. The bitmap data has a value that is represented by eight bits (256 tones) per color component for each pixel. That is, the bitmap data of the present embodiment is image data (RGB image data) in which each pixel has RGB values. Further, in the rendering, information (attribute information) indicating the object attribute of each pixel in the printing-target image data is also generated. This attribute information indicates to which kind of object each pixel belongs and stores, for example, a value that identifies the kind of object, such as text, graphics, and image.

Figures 3A, 3B, 3C:
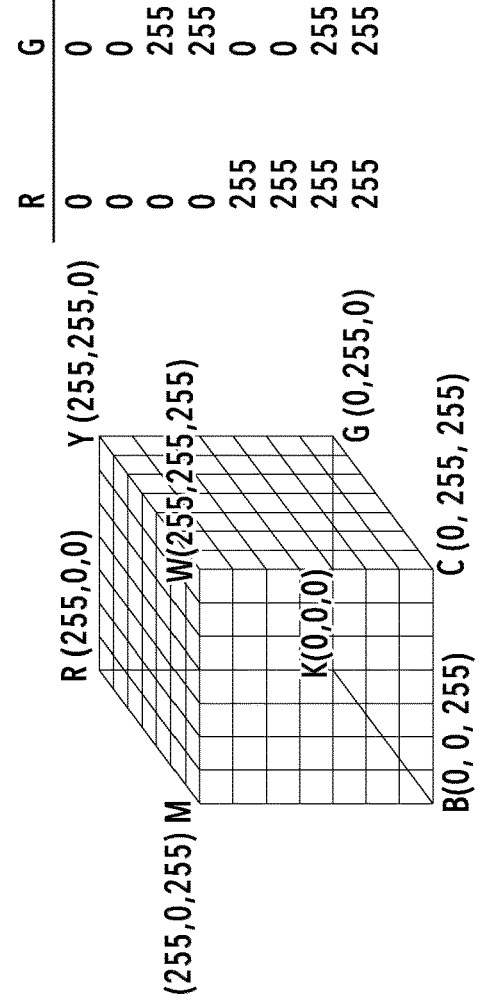
FIG. 3A is a diagram showing a cube of a three-dimensional color space.
FIG. 3B is a diagram showing an example of an LUT that converts RGB into L*a*b*.
FIG. 3C is a diagram showing an example of an LUT that converts RGB into CMYK.

The color conversion unit 202 performs processing (color conversion processing) to convert the RGB image data that is input from the rendering unit 201 into image data (CMYK image data) in which each pixel has CMYK values by using a color conversion LUT 206. Due to this, the color reproduction area of the monitor 130 and the color reproduction area of the printer unit 111 are matched. In the color conversion LUT 206 that converts the color represented in the RGB color space into the color represented in the CMYK color space, in accordance with the value of 8-bit data (0 to 255) of each of RGB, the coordinates in the cube in the three-dimensional color space shown in FIG. 3A are determined. Coordinates of the eight vertexes of the cube represent each of R, B, Y, M, C, K, and W and in a case where R=G=B (gray in which R, and B are equal in amount), the coordinates of the diagonal line (gray axis) of the cube, which connects K and W, are referred to. Further, the color conversion LUT 206 has 16×16×16 grid points specified by the RGB values of the input image data and stores the CMYK values corresponding to the grid points as output values. For example, in the color conversion LUT shown in FIG. 3B, as grid point data corresponding to RGB values (255, 0, 0), CMYK values (0, 255, 255, 0) are stored. In a case where RGB values not defined by a grid point are input, by the interpolation operation using CMYK values associated with RGB values defined by a grid point, CMYK values corresponding to the input RGB values are obtained.

The tone correction unit 203 performs tone correction processing so that the output density that is aimed at can be obtained in the printing processing of the printer unit 111 by using a tone correction LUT (not shown schematically) prepared in advance for the bitmap data in the CMYK space obtained by the color conversion processing.

The quantization unit 204 performs quantization processing (also called "halftone processing") for the bitmap data of each color plane of CMYK after the tone correction processing. Due to this, halftone image data by halftone dot patterns turned so as to have N values (N is a natural number not less than 2) is obtained, in which the halftone within the printing-target image is represented by area gradation. As the halftone processing, a variety of methods have been proposed, such as the density pattern method, systematic dither method, and the error diffusion method, but any method may be used. The obtained halftone image data is sent to the printer unit 111 as print data.

The color conversion LUT creation unit 205 creates the color conversion LUT 206 that the color conversion unit 202 refers to in the color conversion processing. Details of color conversion LUT creation processing will be described later.

In the present embodiment, the configuration is such that all the printer image processing is performed within the image forming apparatus 100, but the technique of the present disclosure is not limited to the configuration such as this. For example, a system configuration may be accepted in which part of the processing, such as the color conversion processing and the quantization processing, is performed by the PC 120, from which the print job is transmitted. Alternatively, a configuration may be accepted in which the image forming apparatus 100 and the PC 120 perform the processing in cooperation with each other in a distributed manner.

<Printing Function Setting>

Figure 4A:
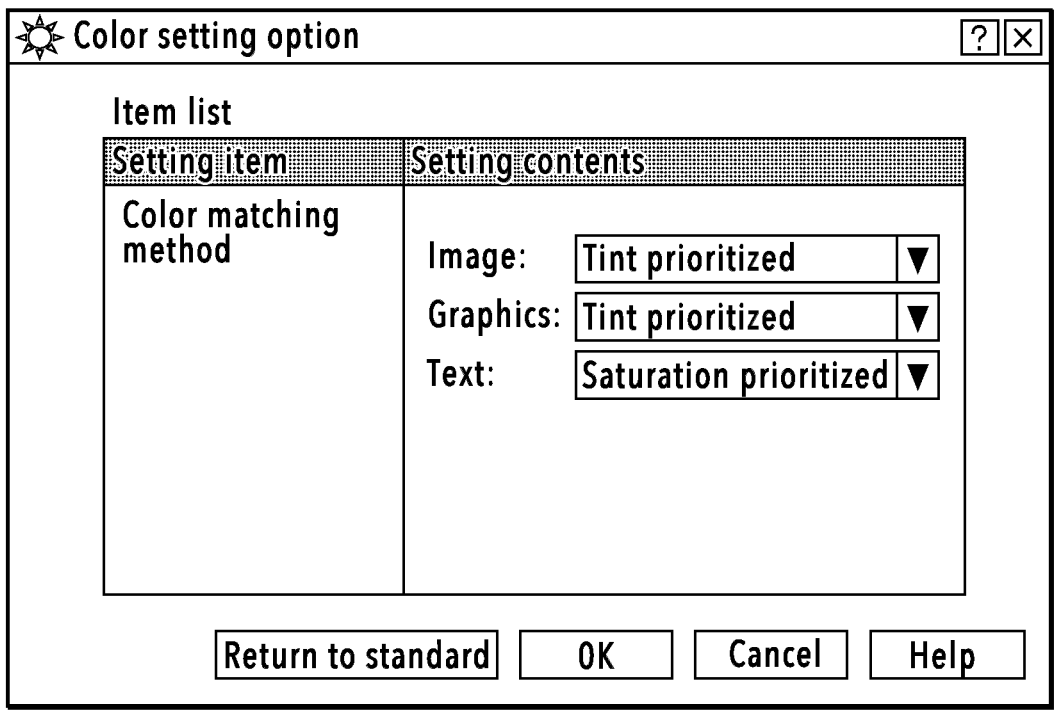
FIG. 4A and FIG. 4B are each a diagram showing an example of a printing setting screen.

Next, the printing function setting in the image forming apparatus 100 is explained. FIG. 4A is a diagram showing an example of a user interface screen (in the following, described as "printing setting screen") for the function setting, which is displayed on the display unit 105 of the image forming apparatus 100. In a "Setting item" field in "Item list" on the printing setting screen shown in FIG. 4A, as the item name of the function that can be designated as an option, "Color matching method" is displayed. Here, the color matching method is the function to set a gamut compression method in matching processing. The color reproduction range (gamut) is different for different devices, and therefore, the matching processing for matching the gamut becomes necessary. In the matching processing in a case where the gamut is matched from the input device whose gamut is wide, such as a display, to the output device whose gamut is narrow, such as a printer, compression of the gamut is performed. Then, in a "Setting contents" field to the right of "Setting item", it is made possible to designate a matching mode for each object attribute. As matching modes prepared as default, there are three kinds as follows.

Tint prioritized: mode in which priority is given to tint with which a photo seems preferable Minimum color difference: mode in which color of an original image is output accurately within the color reproduction range of the printer Saturation prioritized: mode in which priority is given to vivid color development (saturation) on the whole.

It is possible for a user to perform a variety of function settings, including the setting relating to the color matching method, at the time of printing via a similar UI screen that is provided by the printer driver or the application installed in the PC 120.

<Outline of Creation Processing of Color Conversion LUT>

Figure 5:
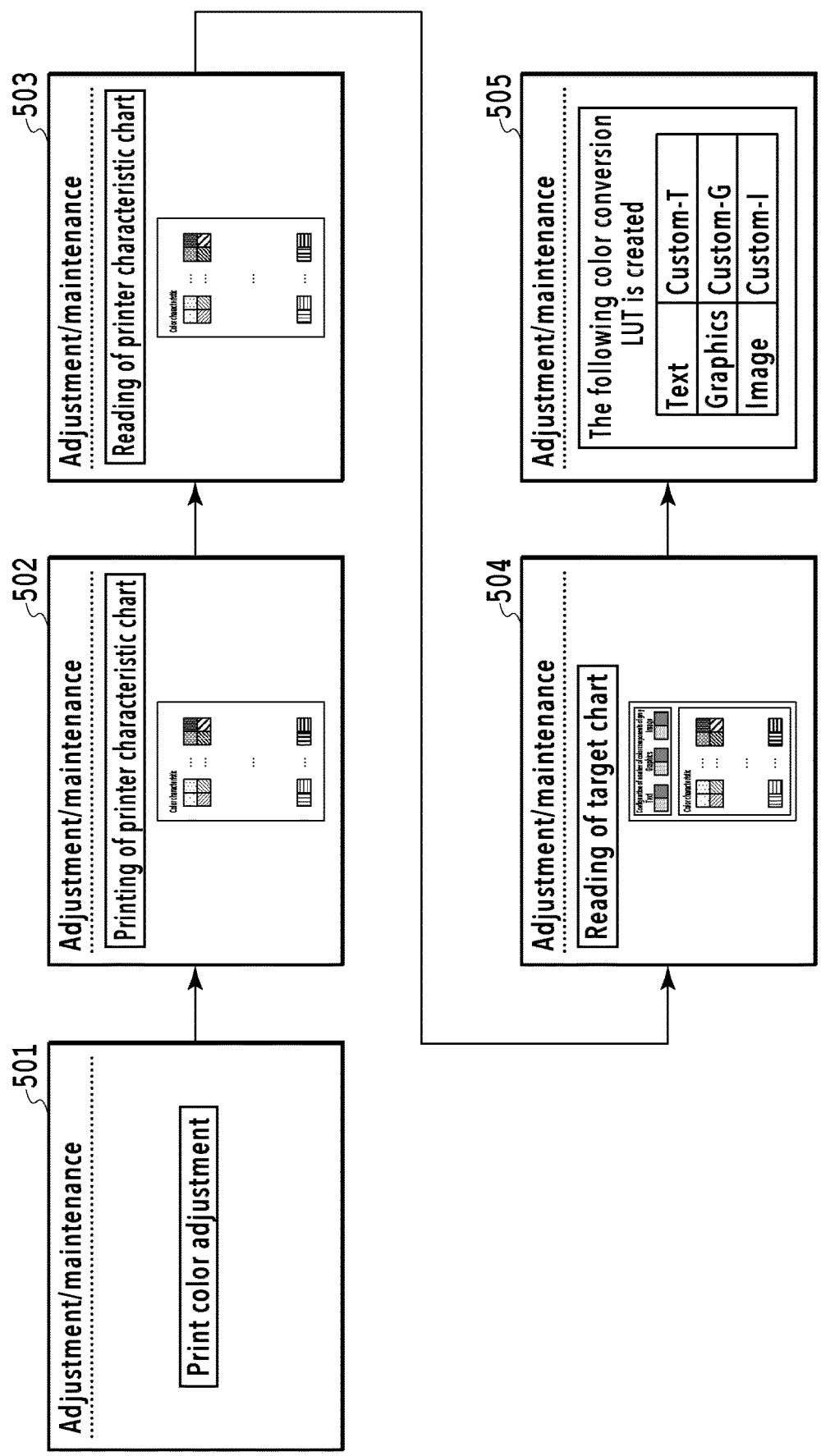
FIG. 5 is a diagram explaining a rough flow at the time of creation of a color conversion LUT according to a first embodiment.

Following the above, a rough flow of the color conversion LUT creation in the color conversion LUT creation unit 205 is explained with reference to FIG. 5. FIG. 5 shows transition of a UI screen (Adjustment/maintenance screen) at the time of performing color adjustment between devices. In the following, an outline of the color conversion LUT creation is explained along FIG. 5.

<<Acquisition of Color Characteristic of Adjustment Device>>

Figure 6A:
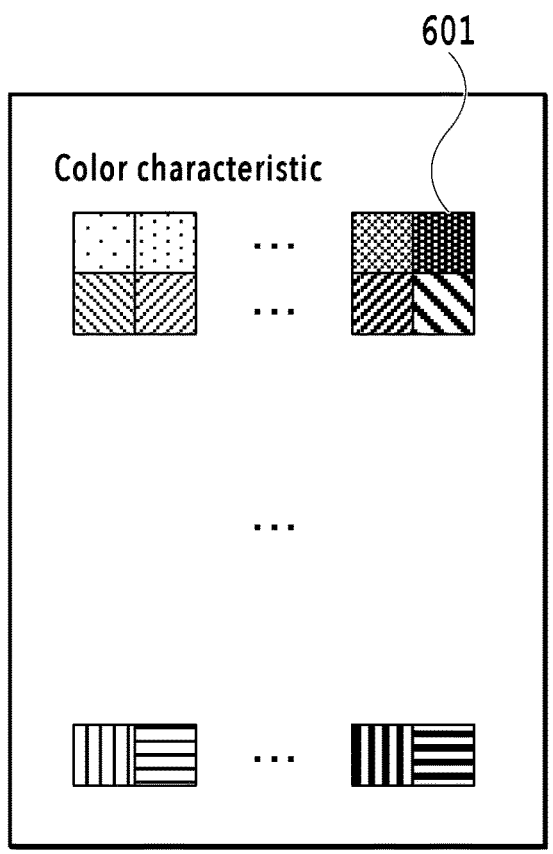
FIG. 6A is a diagram showing an example of a printer characteristic chart and FIG. 6B is a diagram showing an example of a target chart.

First, a user opens an initial screen 501 of the Adjustment/maintenance screen by using the operation unit 106 of the image forming apparatus 100, which is the adjustment device. Next, the user brings about the state of a chart output screen 502 by operating the initial screen 501 and gives instructions to print a color chart (in the following, called "printer characteristic chart") consisting of patches in a variety of colors for acquiring the color characteristic in the printer unit 111. Based on the printing instructions, the printer unit 111 performs printing processing by using image data of the printer characteristic chart prepared in advance. FIG. 6A is a diagram showing an example of the printer characteristic chart. The printer characteristic chart consists of a plurality of patches 601 corresponding to values obtained by sampling 8-bit RGB signal values (0 to 255) at regular intervals. Here, in the present embodiment, in order to suppress a difference from occurring in color adjustment accuracy due to the configuration of number of color components of gray, two kinds of color characteristic are acquired by separately performing two kinds of color conversion processing for the image data of the printer characteristic chart and printing and outputting them, respectively. In the first color conversion processing at this time, color conversion is performed for a gray patch among patches within the printer characteristic chart, which has signal values of R=G=B, by using a color conversion LUT for mixed gray (see FIG. 7A). Due to this, it is made possible to acquire the color characteristic in a case where gray is represented in four colors of CMYK (CMY color mixture gray). In the other color conversion processing, color conversion is performed for the gray patch having signal values of R=G=B by using a color conversion LUT for non-mixed gray (see FIG. 7B). Due to this, it is made possible to acquire the color characteristic in a case where gray is represented in K color (non-mixed gray).

Then, in a case where the two kinds of printer characteristic chart described above are printed by the printer unit 111, the user brings the UI screen into the state of a chart reading screen 503 and gives instructions to read the two kinds of printed and output printer characteristic chart, respectively, after setting them on a document table, not shown schematically. Based on the reading instructions, the scanner unit 107 generates RGB image data represented in the RGB color space by optically reading the printer characteristic charts set on the document table. The generated RGB image data is sent to the scanner image processing unit 108. The scanner image processing unit 108 first performs processing to extract average RGB values for each patch on the chart for each piece of the RGB image data of the two kinds of printer characteristic chart. Then, the scanner image processing unit 108 acquires the above-described two kinds of color characteristic by using a scan color conversion LUT (see FIG. 3C) that is prepared in advance and which converts RGB values into L*a*b* values. Information on the two kinds of color characteristic thus acquired is stored in the RAM 103.

<<Acquisition of Color Characteristic of Destination Device>>

Figure 6B:
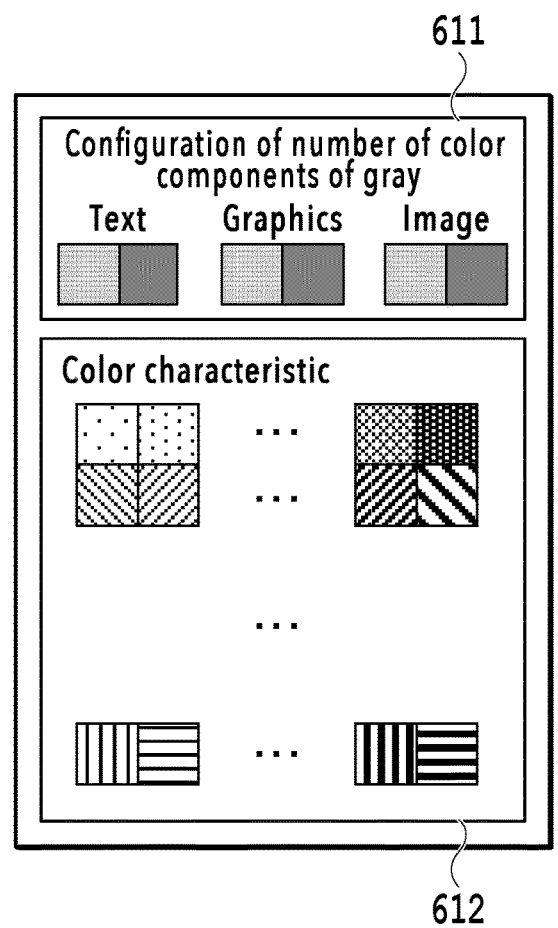

Next, a user brings the UI screen into the state of a chart reading screen 504 and gives instructions to read a color chart (in the following, called "target chart") printed and output in advance by another image forming apparatus (not shown schematically), which is the destination device, after setting the target chart on a document table, not shown schematically. Based on the reading instructions, the scanner unit 107 generates RGB image data represented in the RGB color space by optically reading the target chart set on the document table. The generated RGB image data is sent to the scanner image processing unit 108 and processing to acquire the color characteristic in another image forming apparatus is performed. Here, the target chart is explained. FIG. 6B is a diagram showing an example of the target chart. The target chart consists of a first patch area 611 for checking the configuration of number of color components of gay and a second patch area for acquiring a normal color characteristic. In the first patch area 611, a halftone gray patch corresponding to each of the text attribute, the graphics attribute, and the image attribute is arranged. The patch of the image attribute is defined by JEPG, TIFF and the like, the patch of the graphics attribute is defined by a rectangular drawing designating the coordinate position, the width, and the height of a rectangle, and the patch of the text attribute is defined by a character drawing designating the shape, the size and the like of a font. In the second patch area 612, like the printer characteristic chart in FIG. 6A, patches corresponding to each color and to which, for example, the image attribute is attached, are arranged. For the second patch area 612 of the two patch areas, the same processing as that in the case of the above-described printer characteristic chart is performed. That is, by extracting average RGB values of each patch from the RGB image data corresponding to the second patch area 612 and converting the average RGB values into L*a*b* values, the color characteristic in the destination device is acquired and stored in the RAM 103. On the other hand, in the first patch area 611, predetermined analysis processing is performed for the gray patch of each object attribute within the area and whether each gray patch is represented in mixed gray or represented in non-mixed gray is determined.

<<Creation of Color Conversion LUT in Accordance with Configuration of Number of Color Components of Gray>>

In a case where the information on the color characteristic in the adjustment device and the color characteristic in the destination device is acquired as described above, a color conversion LUT in accordance with the configuration of number of color components of gray is created for each object attribute. The data of the created color conversion LUT is stored in the RAM 103 and at the same time, the state of the UI screen transits to a notification screen 505 and a message to the effect that creation of the color conversion LUT for each object attribute is completed is displayed. Details of the processing to create the color conversion LUT in accordance with the configuration of number of color components of gray will be described later.

The above is the rough flow until the color conversion LUT 206 is created in the color conversion LUT creation unit 205 according to the present embodiment.

Generally, in many cases, the configuration of number of color components of gray is switched to another for each object attribute, such as text, graphics, and image, and therefore, in the present embodiment, it is assumed that the color conversion LUT is created for each object attribute. However, it is not essential to create the color conversion LUT for each object attribute.

Further, it may also be possible to acquire the color (average RGB values) of each patch of the printer characteristic chart and the target chart by using, for example, a color measurement device. Furthermore, it is not necessarily required to acquire the color characteristic of the adjustment device each time. For example, in a case where the time elapsed from the previous acquisition is short, in a case where it is desired to suppress consumption of color materials due to color adjustment, in a case where it is desired to save time and effort taken for color adjustment, and so on, it may also be possible to store the information at the time of the previous acquisition and make use of the information again. In a case where this is performed, for example, it is sufficient to provide in advance a skip button (not shown schematically) within the UI screen and read and use the information on the color characteristic (or the initial color characteristic at the time of factory shipping) acquired in advance and stored in the HDD 104 in a case where the skip button is pressed down.

Further, in the present embodiment, the two kinds of color characteristic for mixed gray and for non-mixed gray are acquired for the adjustment device, but this is not essential. In a case where it is sufficient to match the configuration of number of color components of gray with that of the destination device, such a configuration may be accepted in which only the color characteristic for mixed gray is acquired.

<Details of Color Conversion LUT Creation Processing in Accordance with Configuration of Number of Color Components of Gray>

Figure 8:
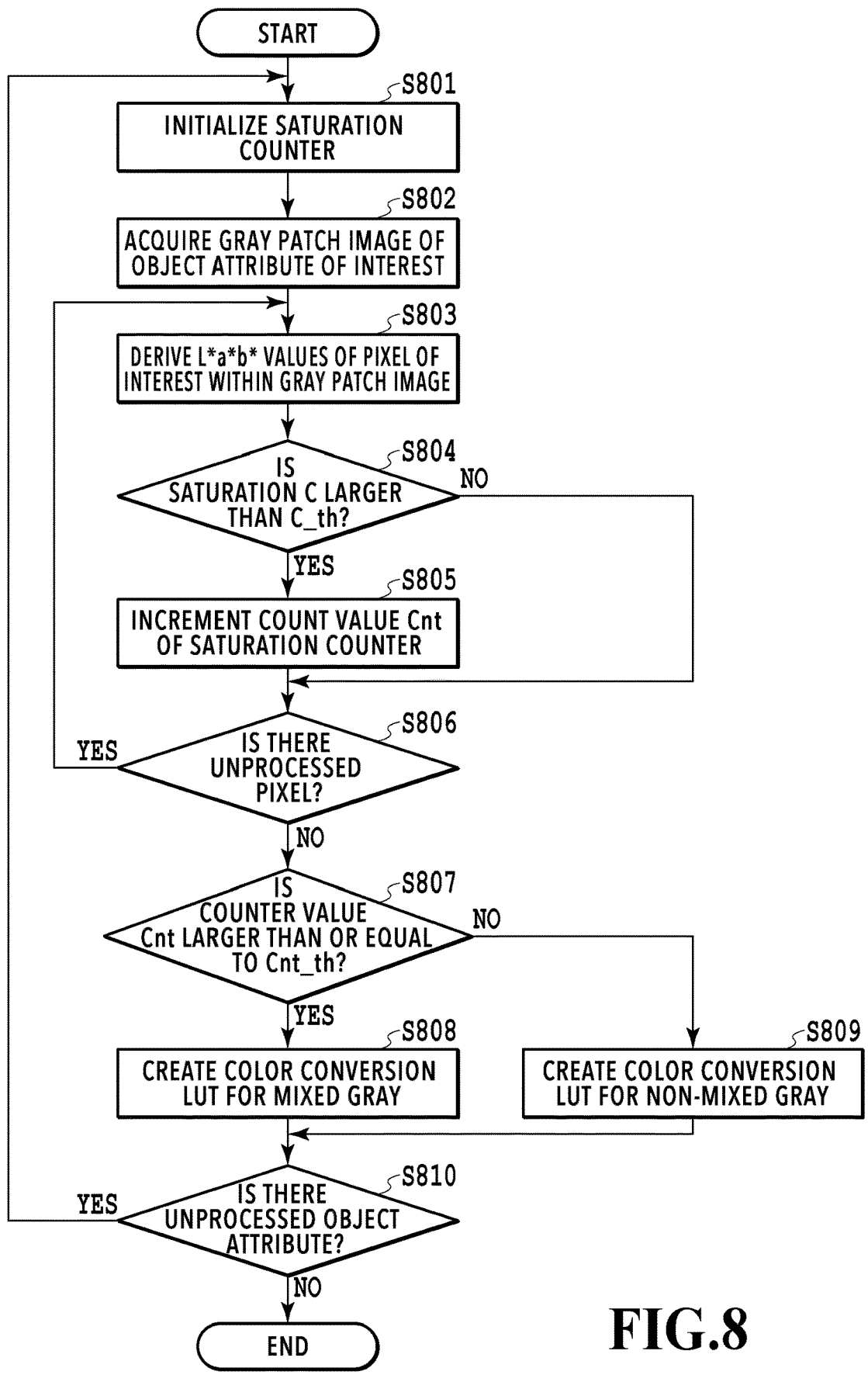
FIG. 8 is a flowchart showing a flow of processing to create a color conversion LUT in accordance with the configuration of number of color components of gray in the destination device.

Next, details of the processing are explained which creates the color conversion LUT in accordance with the configuration of number of color components of gray for each of the text attribute, the graphics attribute, and the image attribute by acquiring the configuration of number of color components of gray in the destination device for each object attribute. FIG. 8 is a flowchart showing a flow of processing to create a color conversion LUT in accordance with the configuration of number of color components of gray in the destination device according to the present embodiment. The series of processing shown in the flowchart in FIG. 8 is implemented by the CPU 101 loading a predetermined program from the ROM 102 onto the RAM 103 and executing the program. In the following explanation, symbol "S" means a step.

First, at S801, a saturation counter is initialized ("0" is set to count value Cnt). Here, the saturation counter is used for counting the number of times saturation C specified by the L*a*b* values (see S803, to be described later) found for each pixel exceeds a predetermined threshold value C_th.

At S802, the object attribute on which attention is focused is determined among the text attribute, the graphics attribute, and the image attribute and a partial image (gray patch image) corresponding to the gray patch of the determined object attribute is acquired from the first patch area of the target chart.

At S803, the L*a*b* values for the pixel of interest within the gray patch image acquired at S802 are derived. The color of each pixel within the gray patch image has RGB values. Then, the RGB values are converted into L*a*b* values by using a scan color conversion LUT (see FIG. 3C) that converts RGB into L*a*b*.

At S804, based on the L*a*b* values derived at S803, whether or not the color of the pixel of interest is a chromatic color is determined. Specifically, the saturation C is found by using formula (1) below from the a* value and the b* value in the L*a*b* values and in a case where the found saturation C exceeds the threshold value C_th, then it is determined that the color is a chromatic color.

[Mathematical formula 1]

$$\text{saturation } C = \sqrt{a^{*2} + b^{*2}} \qquad \text{formula (1)}$$

Here, it is sufficient to set the threshold value C_th to a saturation value at a level at which it can be said that the color is substantially a chromatic color, for example, about C_th=20. In a case where the color of the pixel of interest is determined to be a chromatic color as a result of the above-described threshold value processing, the processing advances to S805. Then, at S805, the above-described count value Cnt of the saturation counter is incremented (+1). On the other hand, in a case where the color of the pixel of interest is determined to be not a chromatic color (determined to be an achromatic color) as a result of the above-described threshold value processing, the processing skips S805 and advances to S806.

At S806, whether or not the determination processing of whether the color is a chromatic color is completed for all the pixels within the gray patch image acquired at S802 is determined. In a case where the determination processing is not completed, the processing returns to S803 and the next pixel of interest is determined from unprocessed pixels and the same processing is determined. On the other hand, in a case where the determination processing is completed, the processing advances to S807.

At S807, based on the count value Cnt of the saturation counter described above, whether the gray patch image obtained at S802 is printed in mixed gray or in non-mixed gray is determined. Specifically, in a case where the count value Cnt at the current point in time is larger than or equal to the threshold value Cnt_th that is set in advance, it is determined that the gray patch image is printed in mixed gray and in a case where the count value Cnt is less than the threshold value, it is determined that the gray patch image is printed in non-mixed gray. Here, as the threshold value Cnt_th, a value is set, which makes the ratio of the chromatic pixels to all the pixels configuring the gray patch image about 10 to 20%. For example, the total number of pixels in a case where the resolution of the gray patch image is 600 dpi and the size is 1 cm×1 cm is 55,696, and therefore, in this case, it is sufficient to set the threshold value Cnt_th to about 5,500 to 11,000. In a case where the count value Cnt of the saturation counter is larger than or equal to the threshold value Cnt_th, pixels whose saturation is high are included in a predetermined ratio within the gray patch image, and therefore, it is possible to determine that the configuration of number of color components of gray is mixed gray. On the other hand, in a case where the count value Cnt is less than the threshold value Cnt_th, pixels whose saturation is high are not included so much within the gray patch image, and therefore, it is possible to determine that the configuration of number of color components of gray is non-mixed gray. In a case where the results of the above-described threshold value processing indicate that the count value Cnt of the saturation counter is larger than or equal to the threshold value, the processing advances to S808 and in a case where the count value Cnt is less than the threshold value, the processing advances to S809.

At S808, a color conversion LUT for mixed gray is created. Further, at S809, a color conversion LUT for non-mixed gray is created. The specific creation method of these color conversion LUTs will be described later.

Then, at S810, whether or not the creation of the color conversion LUT in accordance with the configuration of number of color components of gray is completed for all the object attributes is determined. In a case where the creation is not completed yet, the processing returns to S801, and the next object attribute of interest is determined and the processing is continued, and in a case where the creation is completed, this processing is terminated.

The above is the contents of the color conversion LUT creation processing in accordance with the configuration of number of color components of gray according to the present embodiment. The determination method of the configuration of number of color components of gray is not limited to the method based on the saturation of the pixel configuring the gray patch image. For example, it is also possible to find a difference between the channels from the RGB values of the pixel configuring the gray patch image and determine that the configuration of number of color components of gray is mixed gray in a case where the number of pixels whose found difference is larger than or equal to a predetermined threshold value is larger than or equal to a predetermined number, and that it is non-mixed gray in a case where the number is less than the predetermined number. Further, it may also be possible to find an average value, a median, standard deviation or the like of each of the R component, the G component, and the B component in the entire gray patch image in stead of for each pixel and perform the determination based on the magnitude of the difference between channels thereof.

<Creation Method of Color Conversion LUT>

Figure 9:
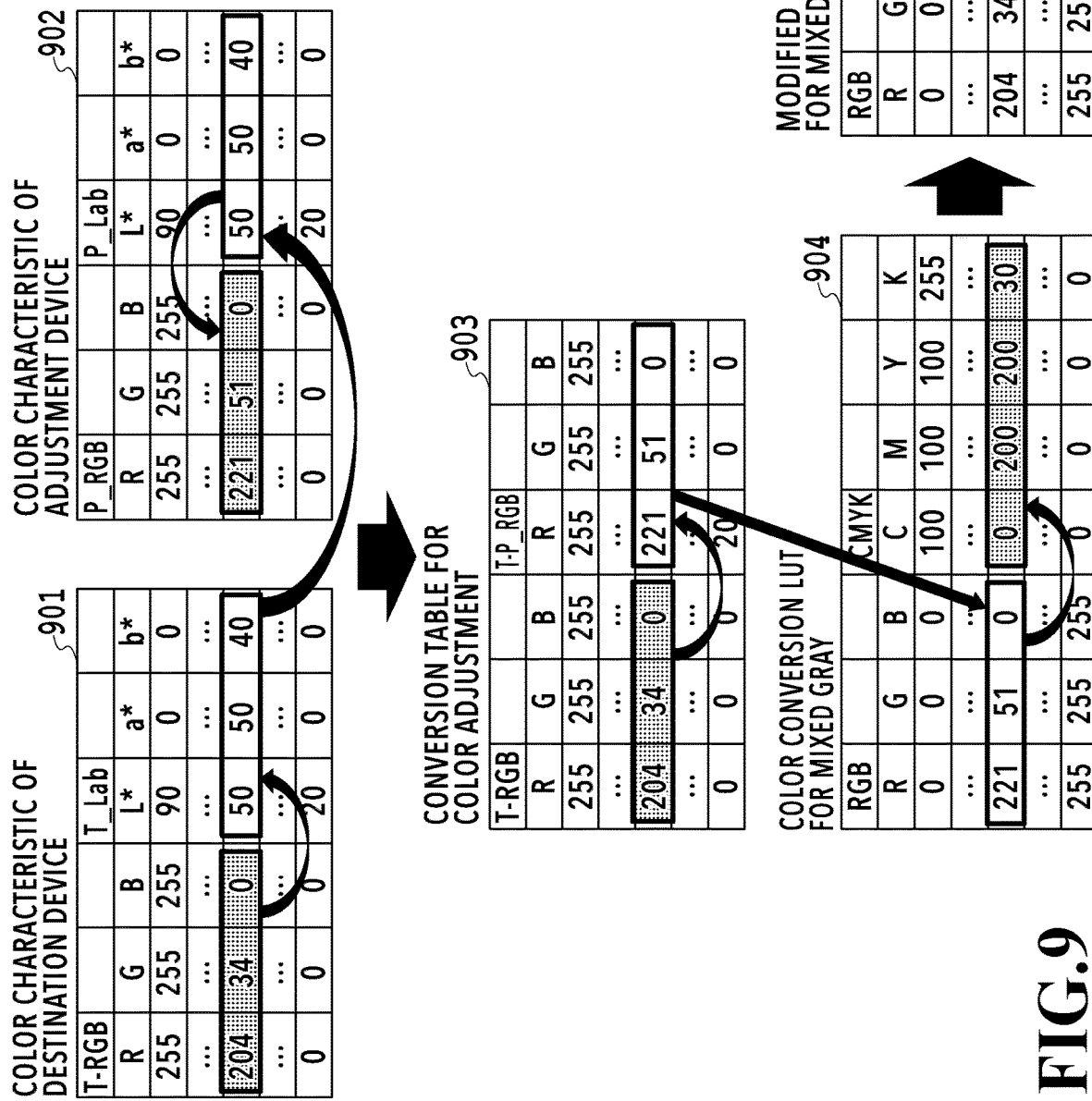
FIG. 9 is a diagram explaining a creation procedure of a color conversion LUT for mixed gray.

Next, details of the creation method of a color conversion LUT at S808 and S809 are explained. The creation procedure itself is common to S808 and S809, and therefore, in the following, explanation is given by taking a case as an example where a color conversion LUT for mixed gray is created. FIG. 9 is a diagram explaining the creation procedure of a color conversion LUT for mixed gray. In the following, explanation is given along FIG. 9.

First, the data of the color characteristic of the adjustment device and the color characteristic of the destination device is acquired from the RAM 103. The color characteristic of the adjustment device at this time is the color characteristic of the two kinds of color characteristic described previously, which is obtained based on the output results of the printer characteristic chart for which color conversion has been performed by the color conversion LUT for mixed gray. Here, in FIG. 9, a table 901 shows the color characteristic of the destination device and a table 902 shows the color characteristic of the adjustment device. In the following explanation, RGB values in the table 901 are described as "T_RGB" and L*a*b* values corresponding thereto are described as "T-Lab", and RGB values in the table 902 are described as "P_RGB" and L*a*b* values corresponding thereto are described as "P_Lab".

Next, from P_Lab in the color characteristic of the adjustment device, P_Lab having values that match with those of T_Lab corresponding to T_RGB, which is a destination color, is searched for and P_RGB corresponding to the matching P_Lab is found by back calculation. Here, in the example in FIG. 9, T_RGB is "204, 34, 0", T_Lab is "50, 50, 0", and P_Lab are "50, 50, 40" and as P_RGB corresponding to the P_Lab, "221, 51, 0" are found. In the following explanation, P_RGB that is found by the back calculation such as this is described as "T-P_RGB". In this manner, the above-described back calculation processing is performed for each of the RGB values of the destination color and a combination group of T_RBG and T-P_RGB is obtained. Then, a table consisting of the obtained combination groups is created and stored in the RAM 103 as a color adjustment conversion table. In FIG. 9, a table 903 is an example of a color adjustment conversion table that puts together the combination groups of T_RGB and T-P_RGB. It can be seen that by performing color conversion processing in the adjustment device after converting T_RGB values into T-P_RGB values with reference to the color adjustment conversion table 903 thus obtained, it is made possible to reproduce a color in the adjustment device, which matches with the color reproduced in the destination device.

Then, based on the above-described color adjustment conversion table 903 and the configuration of number of color components of gray in the destination device for the object attribute of interest, the input RGB values in the color conversion LUT for mixed gray shown in FIG. 7A described previously are modified. For example, it is assumed that gray is represented in mixed gray in the destination device in a case where the color conversion LUT for the image attribute is created. In this case, corresponding output values (CMYK) in a color conversion LUT for mixed gray 904 on a condition that T-P_RGB (here, "221, 51, 0") corresponding to T_RGB (here, "204, 34, 0") is taken as input values are found with reference to the color adjustment conversion table 903. Here, as the output values, CMYK="0, 200, 200, 30" are found as a result. Then, in the color conversion LUT for mixed gray 904, the input RGB values associated with the found output CMYK values are changed into values of T_RGB (here, "204, 34, 0"). In this manner, a new color conversion LUT for mixed gray 905 is obtained, in which T_RGB and CMYK are associated with each other. In a case where gray is non-mixed gray, it is sufficient to perform the same processing by taking, as a target, the color conversion LUT for non-mixed gray indicating the other color characteristic of the two kinds of color characteristic acquired for the adjustment device. The color conversion LUT for mixed gray and the color conversion LUT for non-mixed gray, for which the modification such as this has been performed, are stored in the RAM 103 as the color conversion LUT 206 for which color adjustment with the destination device has been completed.

There is a case where the range of reproducible color (gamut, color gamut) is different between the destination device and the adjustment device. In a case where the gamut of the destination device exceeds the gamut of the adjustment device, it is necessary to replace T_Lab with P_Lab that is within the gamut of the adjustment device and which is an approximate color. The method for this is generally called gamut mapping. As a specific method, for example, there is color difference minimum gamut mapping. The color difference ($\Delta E$) referred to here is expressed by formula (2) below in accordance with the CIE 1976 Lab color system.

[Mathematical formula 2]

$$\Delta E = \sqrt{\Delta L^2 + \Delta a^2 + \Delta b^2} \qquad \text{formula (2)}$$

In formula (2) described above, $\Delta L = L_1 - L_2$, $\Delta a = a_1 - a_2$, and $\Delta b = b_1 - b_2$. Further, as a formula for finding a color difference, there are a CIE 1994 color difference formula, a CIE 2000 color difference formula and the like, other than formula (2) described above. It is possible to implement gamut mapping by performing replacement with L*a*b* values that are within the gamut of the adjustment device and whose color difference is the minimum.

Figure 4B:
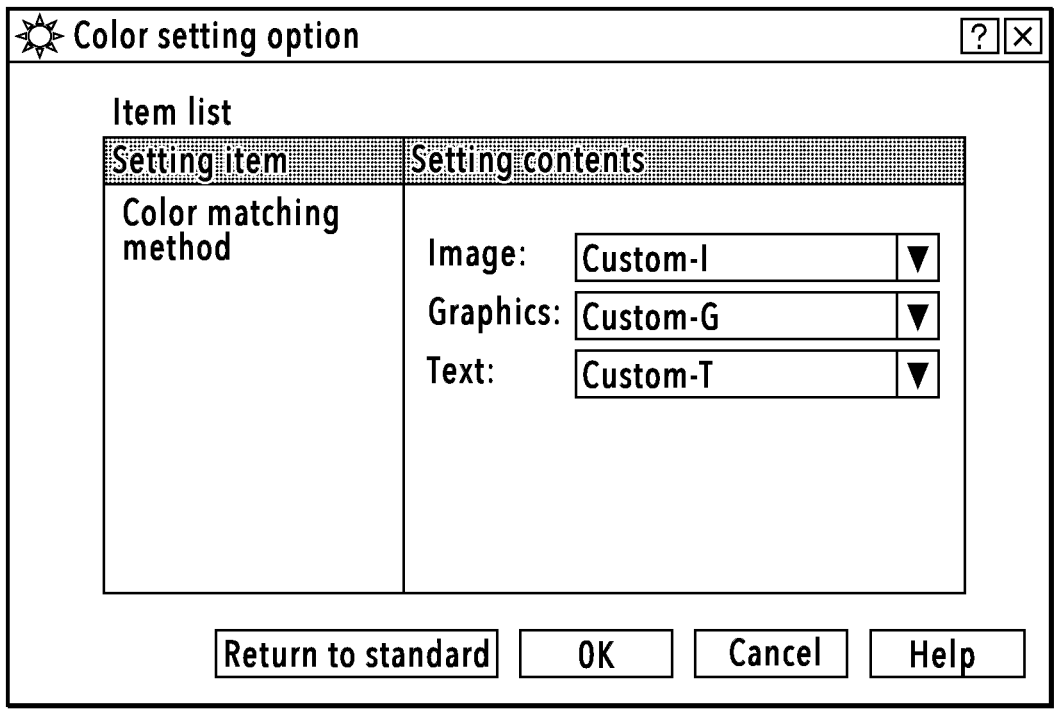

The above is the contents of the creation processing of the color conversion LUT according to the present embodiment. The color conversion LUT for mixed gray and the color conversion LUT for non-mixed gray, for which color adjustment with the destination device has been completed, are stored in the HDD 104 or the like and added as alternatives that can be set for each object attribute in the setting of the color matching method on the printing setting screen shown in FIG. 4A described previously. In a case where a user desires to match the impression (tint) at the time of reproduction of gray with that of a specific destination device, the user is only required to select the color conversion LUT for which color adjustment with the destination device has been completed for each object attribute (see FIG. 4B) at the time of printing of a document and give printing instructions. In this case, it takes time and effort for a user to select the color conversion LUT for each object attribute each time printing instructions are given and a user needs to acquire knowledge at a certain level or higher. Consequently, it may also be possible for a user to, after creating the color conversion LUT for each object attribute as described above, store in advance the color conversion LUT in a form, such as "favorite setting" or "default setting". Due to this, it is possible to improve convenience of a user. In the following, a specific procedure is explained by taking a case as an example where the color conversion LUT is stored and registered as "favorite setting".

<Favorite Registration Processing>

Figure 10:
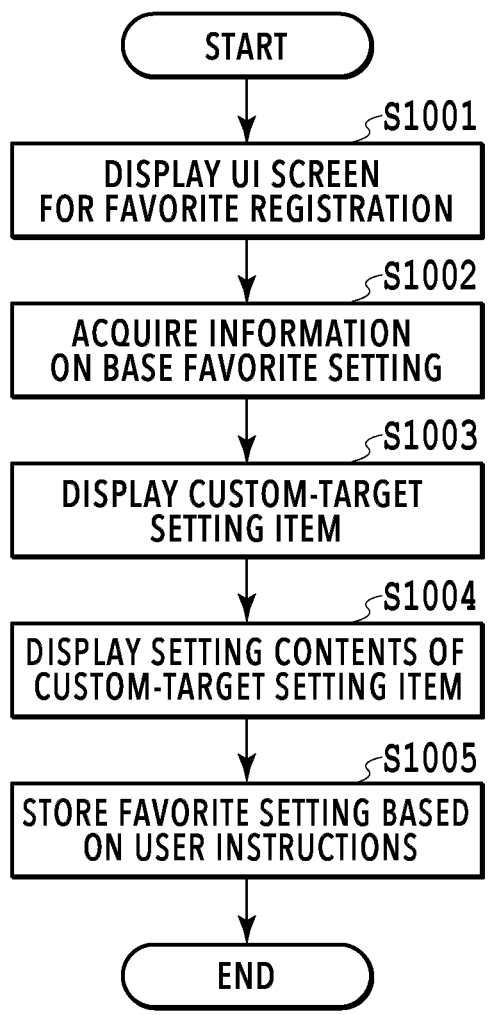
FIG. 10 is a flowchart showing a flow of favorite registration processing relating to a color matching method.

FIG. 10 is a flowchart showing a flow of favorite registration processing relating to the color matching method. The series of processing shown in the flowchart in FIG. 10 is implemented by the CPU 101 loading a predetermined program from the ROM 102 onto the RAM 103 and executing the program. In the following explanation, symbol "S" means a step.

Figure 11:
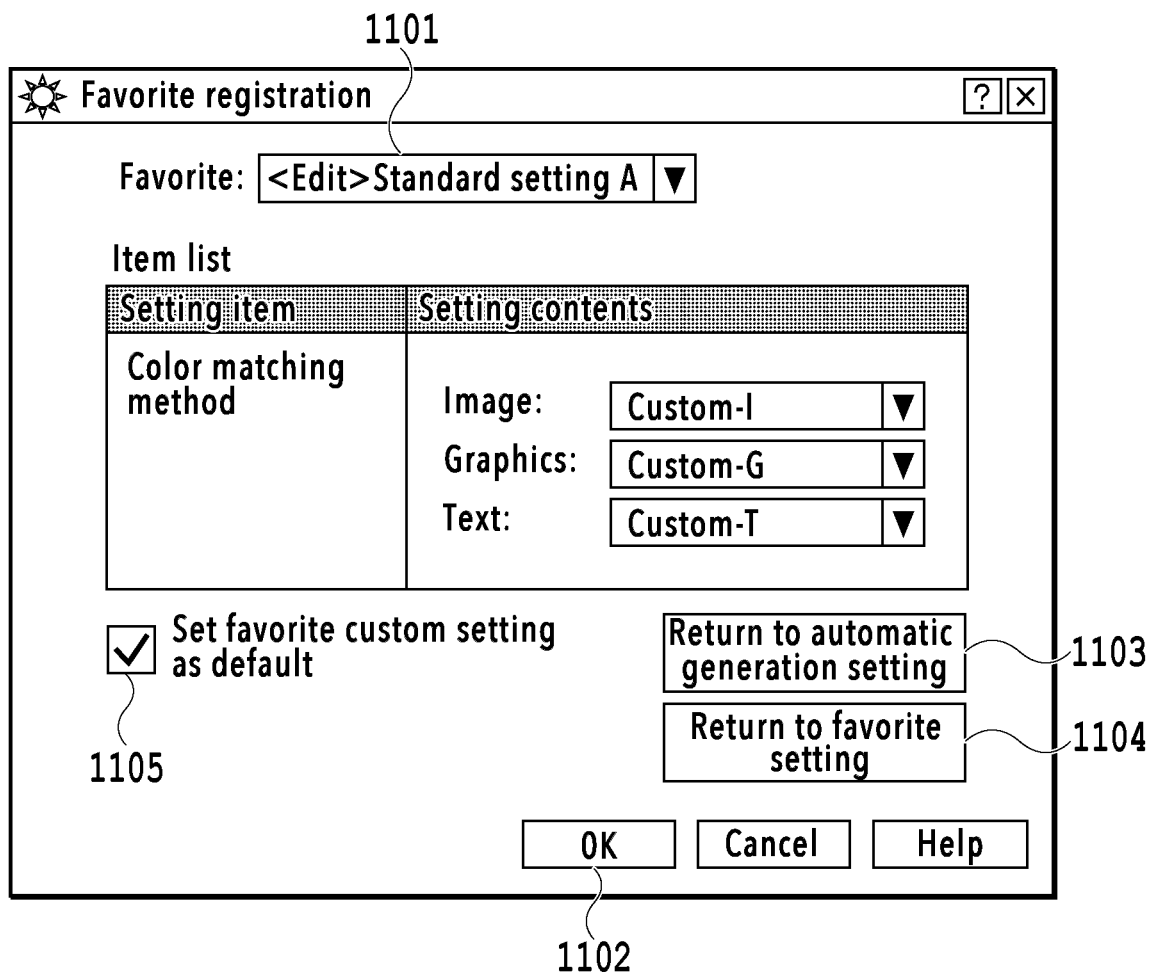
FIG. 11 is a diagram showing an example of a Favorite registration screen.

At S1001, a UI screen (Favorite registration screen) for favorite registration processing as shown in FIG. 11 is displayed on the display unit 105. At next S1002, based on the setting value in a setting name field 1101 within the Favorite registration screen, information on the favorite setting, which serves as a base, is acquired based on user instructions that are input via the operation unit 106. It is assumed that information on some favorite settings (here, two settings: Standard setting A and Standard setting B) as shown in Table 1 below is prepared in advance and stored in the RAM 103 or the like. Then, a user selects and designates one name of the desired favorite setting from the list that is displayed in a pulldown manner.

TABLE 1

| Name of favorite setting | Matching mode for image attribute | Matching mode for graphics attribute | Matching mode for text attribute |
| --- | --- | --- | --- |
| Standard setting A | Color difference minimum | Tone prioritized | Saturation prioritized |
| Standard setting B | Tone prioritized | Tone prioritized | Tone prioritized |

The example in FIG. 11 shows the state where "Standard setting A" is selected by a user and in the setting name field 1101, the word "<Edit>" is attached (inserted automatically). This represents there is a possibility that the contents of the selected favorite setting (matching mode for each object attribute) are replaced by the color conversion LUT created in the flow in FIG. 8 described previously.

At S1003, the item name (here, "Color matching method") of the function a user can customize is displayed in a "Setting item" field in "Item list" within the Favorite registration screen. At S1004 that follows, the setting value corresponding to the item name displayed at S1003 is displayed in a "Setting contents" field. As the setting value that is displayed in this case, the name representing the color conversion LUT created in the flow in FIG. 8 described previously is displayed preferentially in place of the matching mode specified by the favorite setting selected by a user. As will be described later, for example, in a case where the color conversion LUT is not created for a specific object attribute or the like, the matching mode specified by the favorite setting relating to the user selection is displayed as a result. At S1005, based on user instructions that are input via the operation unit 106, the favorite setting having the setting value displayed within the field of "Setting contents" is stored. For example, it is assumed that a user presses down an "OK" button 1102 within the Favorite registration screen in the display state in FIG. 11. In this case, a new favorite setting in which the matching mode for each object attribute of image, graphics, and text has been changed to the contents being displayed is stored. At this time, it may also be possible for a user to store the new favorite setting by inputting a new name to the setting name field 1101 or store it by overwriting. Further, it is also possible for a user to change the matching mode for an arbitrary object attribute to arbitrary contents by list selection within the "Setting contents" field. Further, it is possible to return to the name representing the color conversion LUT created in the flow in FIG. 8 by pressing down a "Return to automatic generation setting" button 1103 after performing list selection. Further, it is possible to return to the contents specified by the information on the favorite setting relating to the user selection acquired at S1002 by pressing down a "Return to favorite setting" 1104. Furthermore, by checking a checkbox 1105, it is possible to designate the favorite setting that is registered newly by pressing down the "OK" button 1102 as the default setting in the color matching method.

As above, it is made possible for a user to easily designate the optimum color conversion LUT in a case where the user desires to perform printing in accordance with the destination device by registering the color conversion LUT as the favorite setting relating to the color matching after creating the color conversion LUT in the flow in FIG. 8. It is also possible for a user to perform the setting relating to the above-described favorite registration processing via a UI screen similar to that in FIG. 11, which is provided by a printer driver or an application installed in the PC 120.

Modification Example 1

In the flow in FIG. 8 described above, the configuration of number of color components of gray is specified by printing the chart including the gray patch for each object attribute in the destination device and the color conversion LUT whose configuration of number of color components of gray is matched is created for each object attribute. However, the color conversion LUT for each object attribute is not necessarily required at all times. Consequently, an aspect is explained as a modification example 1 in which only the necessary color conversion LUT is created by outputting a dedicated chart for each object attribute in the destination device and determining whether or not the tint is different between object attributes based on the scanned image thereof.

Figure 12:
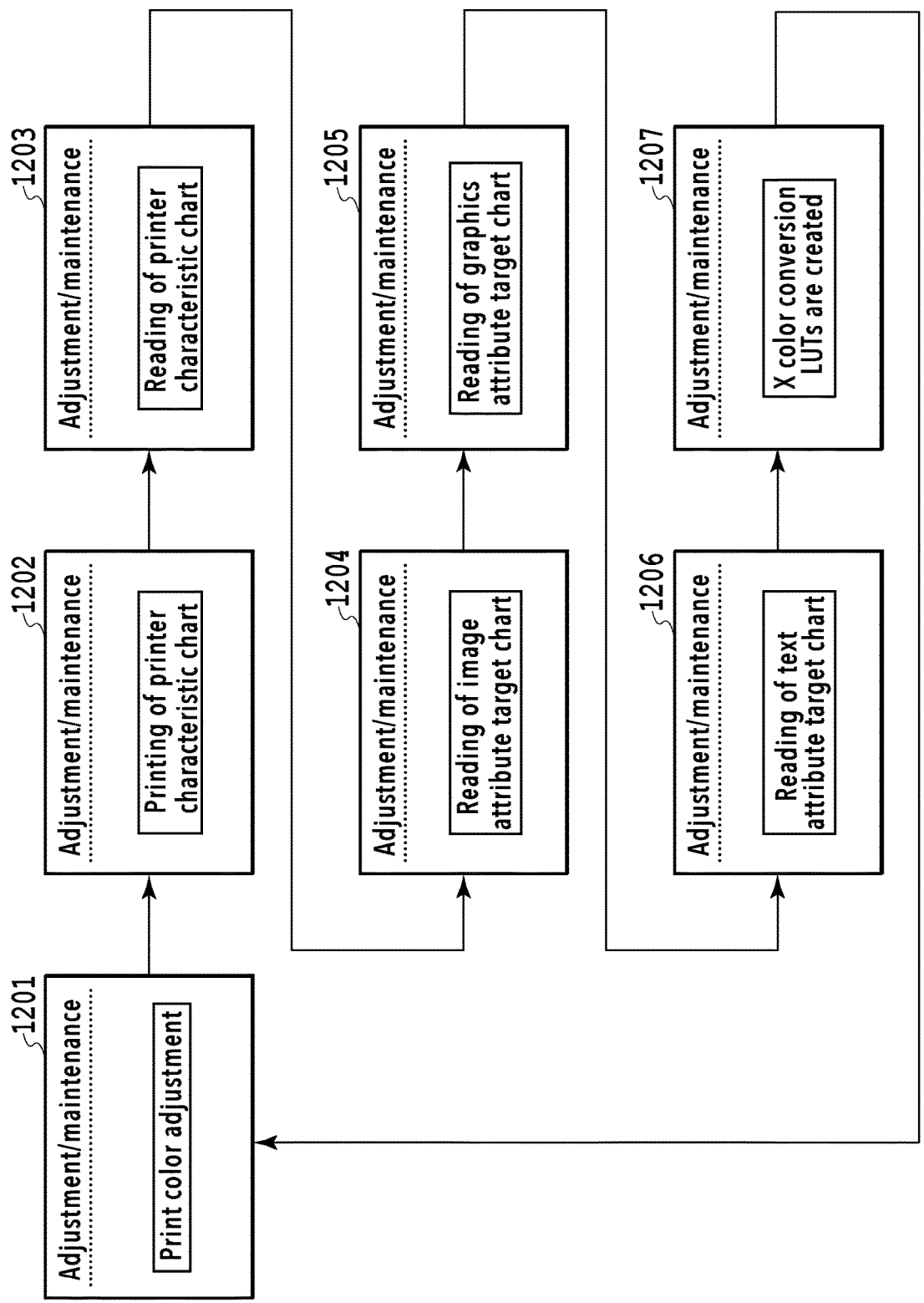
FIG. 12 is a diagram showing an example of an Adjustment/maintenance screen.

First, a rough flow until the color conversion LUT is created according to the present modification example is explained with reference to FIG. 12. FIG. 12 shows transition of a UI screen (Adjustment/maintenance screen) that is displayed on the display unit 105 at the time of creation of the color conversion LUT as in FIG. 5 described previously. In the following, explanation of the portions common to those in FIG. 5 is omitted or simplified and different points are explained mainly below.

<<Acquisition of Color Characteristic of Adjustment Device>>

First, by using the operation unit 106 of the adjustment device, an initial screen 1201 of an Adjustment/maintenance screen is opened. A user brings about the state of a chart output screen 1202 by operating the initial screen 1201 and gives instructions to print a printer characteristic chart for acquiring the color characteristic in the printer unit 111. Based on the printing instructions, the printer unit 111 prints the printer characteristic chart. The color conversion LUT that is used in the color conversion processing at the time of the printing may be only the color conversion LUT for mixed gray, or it may also be possible to acquire two kinds of color characteristic by further performing color conversion using the color conversion LUT for non-mixed gray.

Then, in a case where the printer characteristic chart is printed and output by the printer unit 111, a user brings the UI screen to the state of a chart reading screen 1203 and gives instructions to read the printer characteristic chart that is printed and output. Based on the reading instructions, the scanner unit 107 generates RGB image data by optically reading the printer characteristic chart set on a document table, not shown schematically. The generated RGB image data is sent to the scanner image processing unit 108 and the information on the color characteristic in the adjustment device is acquired.

<<Acquisition of Color Characteristic of Destination Device>>

Next, the user changes the UI screen to the states of chart reading screens 1204 to 1206 in order and gives instructions to read the target chart for each attribute, which is printed and output in advance in the destination device. In the present modification example, a target chart consisting of patches in 9×9×9=729 colors is used for each of the three kinds of image attribute, graphics attribute, and text attribute. FIG. 13A to FIG. 13C each show an example of a print job that is input to the destination device at the time of giving instructions to print the target chart for each attribute from the PC 120. In "Job attribute definition portion", the type (in the example, plain paper) of the printing medium of the first page of the physical page is designated and in a case where the target chart continues across a plurality of pages, the second and subsequent pages of the physical pages are also designated, but it is desirable for the printing medium to be common to pages. The physical page is a concept that makes a pair with that of the logical page indicating an image that is formed on the memory space of the printing device and means the page of the printing medium on which the image of the logical page is formed. One page of the physical page has the same meaning as that of one printing medium. Further, in "Drawing information definition portion", the object attribute at the time of drawing each patch is designated. For example, in a case of the print job in FIG. 13A, "Image" is designated and in this case, each patch is configured as JPEG, TIFF or the like. In a case of the print job in FIG. 13B in which "Graphics" is designated, each patch is configured by a rectangular drawing (formed by designating the width and height of a rectangle at the designated coordinate position). Further, in a case of the print job in FIG. 13C in which "Text" is designated, each patch is configured by a character drawing (formed by designating the shape, size and the like of the font). Based on the reading instructions from a user, the scanner unit 107 sequentially reads the target chart for each attribute described above, which is output for each attribute, and generates RGB image data for each attribute. The generated RGB image data for each attribute is sent to the scanner image processing unit 108 and the information on the color characteristic for each attribute in the destination device is acquired.

<<Creation of Color Conversion LUT>>

In a case where the information on the color characteristic in the adjustment device and the color characteristic for each attribute in the destination device is acquired as described above, the color conversion LUT is created in accordance with the necessity thereof. The data of the created color conversion LUT is stored in the RAM 103 and at the same time, the state of the UI screen transitions to a notification screen 1207 and a message to the effect that creation of X (in this example, three at most) color conversion LUTs is completed is displayed in accordance with the necessity thereof.

Figure 14:
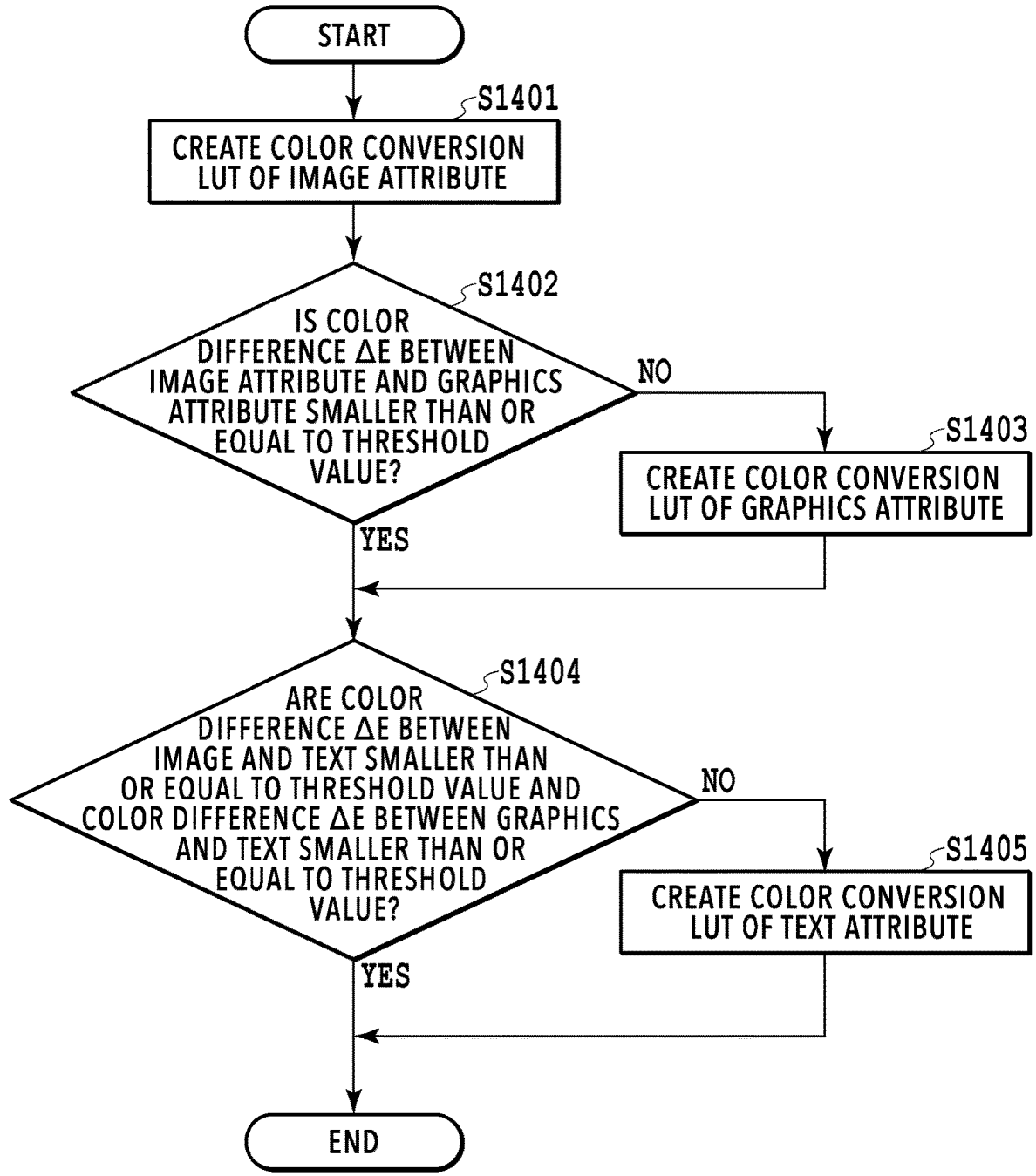
FIG. 14 is a flowchart showing a flow of processing to create a color conversion LUT according to a modification example 1.
Figure 15A:
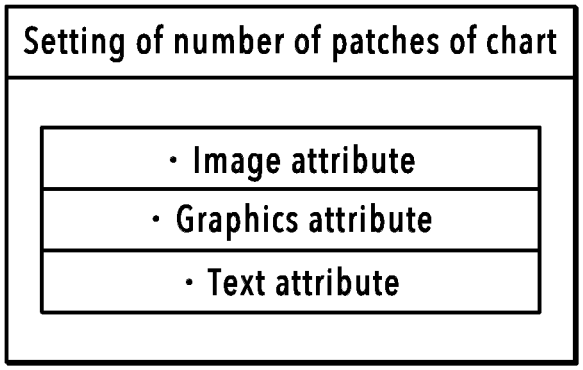
FIG. 15A to FIG. 15D are each a diagram showing an example of a setting of number of patches screen.
Figure 15B:
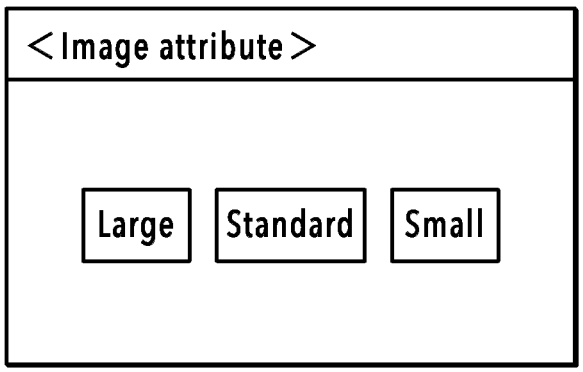
Figure 15C:
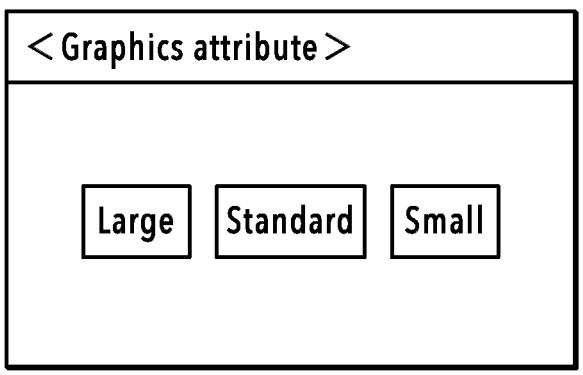
Figure 15D:
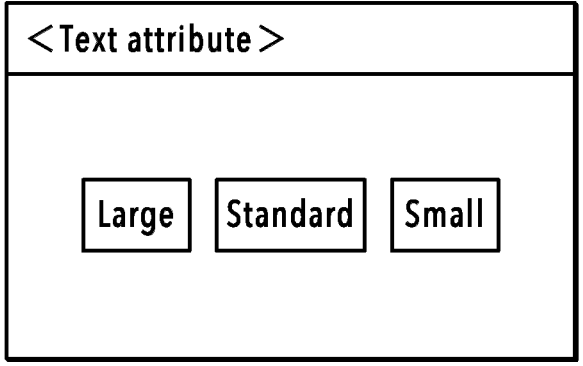

FIG. 14 is a flowchart showing a flow of processing to create a color conversion LUT according to the present modification example. In the following, explanation is given along the flow in FIG. 14.

First, at S1401, by using the color characteristic of the image attribute, which is used as the reference, among the color characteristic for each attribute acquired for the destination device and the color characteristic acquired for the adjustment device, the color conversion LUT corresponding to the image attribute is created. The creation method of the color conversion LUT here is the same as that in the case of S808 and S809 described previously, and therefore, explanation thereof is omitted.

At next S1402, based on the color characteristic of the image attribute in the destination device and the color characteristic of the graphics attribute, the color difference between both the attributes is found and whether the color difference is so large that the allowable range is exceeded is determined. Specifically, the color difference between the L*a*b* values in the color characteristic of the image attribute and the L*a*b* values in the color characteristic of the graphics attribute is calculated for each patch and an average color difference ΔE of the color difference of each patch is found and whether or not the average color difference ΔE is less than or equal to a threshold value determined in advance is determined. In a case where the average color difference ΔE exceeds the threshold value, the processing advances to S1403 and in a case where the average color difference ΔE is less than or equal to the threshold value, the processing advances to S1404.

At S1403, by using the color characteristic of the graphics attribute among the color characteristic for each attribute acquired for the destination device and the color characteristic of the adjustment device, the color conversion LUT corresponding to the graphics attribute is created. Then, at S1404, based on the color characteristic of the image attribute in the destination device and the color characteristic of the text attribute, the color difference between both the attributes is found and whether the color difference is so large that the allowable range is exceeded is determined. Specifically, the color difference between the L*a*b* values in the color characteristic of the image attribute and the L*a*b* values in the color characteristic of the text attribute is calculated for each patch and an average color difference ΔE of the color difference of each patch is found and whether or not the average color difference ΔE is less than or equal to a threshold value determined in advance is determined. In a case where the average color difference ΔE exceeds the threshold value, the processing advances to S1405 and in a case where the average color difference ΔE is less than or equal to the threshold value, this processing is terminated.

At S1405, by using the color characteristic of the text attribute among the color characteristic for each attribute acquired for the destination device and the color characteristic of the adjustment device, the color conversion LUT corresponding to the text attribute is created.

The above is the flow of the creation of the color conversion LUT according to the present modification example. In a case of the present modification example, whether or not the tint, which is the results of the color processing, is different between the object attributes is determined in the destination device and only in a case where the tint is different, it is possible to create the color conversion LUT for reproducing the color of the destination device for each object attribute.

Modification Example 2

With the method of the modification example 1 in which the target chart that is different for each object attribute is prepared and printed, the number of output charts increases, and therefore, an increase in cost in terms of time and economic cost accompanying chart printing will result. As regards this point, there is also a case where it is desired to perform accurate color adjustment for an image, but for text, it is sufficient to perform color adjustment only for principal colors. Consequently, it may also be possible for a user to set in advance the number of patches to be formed on the target chart for each of the image attribute, the graphics attribute, and the text attribute and form only the minimum requisite patches on the target chart. FIG. 15A to FIG. 15D are each a diagram showing an example of a UI screen (number of patches setting screen" for setting the number of patches on the target chart. In a case where a user selects an arbitrary object attribute on a main screen in FIG. 15A, the display of the screen switches to that of a sub screen for each attribute shown in FIG. 15B to FIG. 15D. A user selects "Large" in a case where the user desires to perform more accurate color adjustment or selects "Small" in a case where it is sufficient to perform simple color adjustment. Then, the print job of the target chart is generated for each attribute in accordance with the number of patches that is set for each object attribute and printed and output in the destination device. In place of the configuration in which a user is caused to set the number of patches, a configuration may be accepted in which "Large" or "Small" of the number of patches is determined in advance for each object attribute. For example, "Large" is set for image, "Standard" for graphics, and "Small" for text. In this case, it is possible to reduce the time and effort to perform target chart printing.

As above, according to the present modification example, for the target chart of the object attribute for which it is sufficient to perform simple color adjustment, the number of patches is reduced, and therefore, it is possible to reduce the number of charts and suppress the cost of chart printing.

Modification Example 3

Next, a method of reducing the cost of target chart printing by another approach is explained as a modification example 3. In the present modification example, first, the target chart of one reference object attribute (for example, image attribute) and a dedicated chart (in the following, called "attribute check chart") for determining whether or not the contents of the color processing are different for each object attribute are printed and output. Then, by using the attribute check chart, whether or not the destination device has switched the color processing for each object attribute is determined and a user is notified of the results and the user is caused to determine whether additional creation of the color conversion LUT is necessary.

Figure 16:
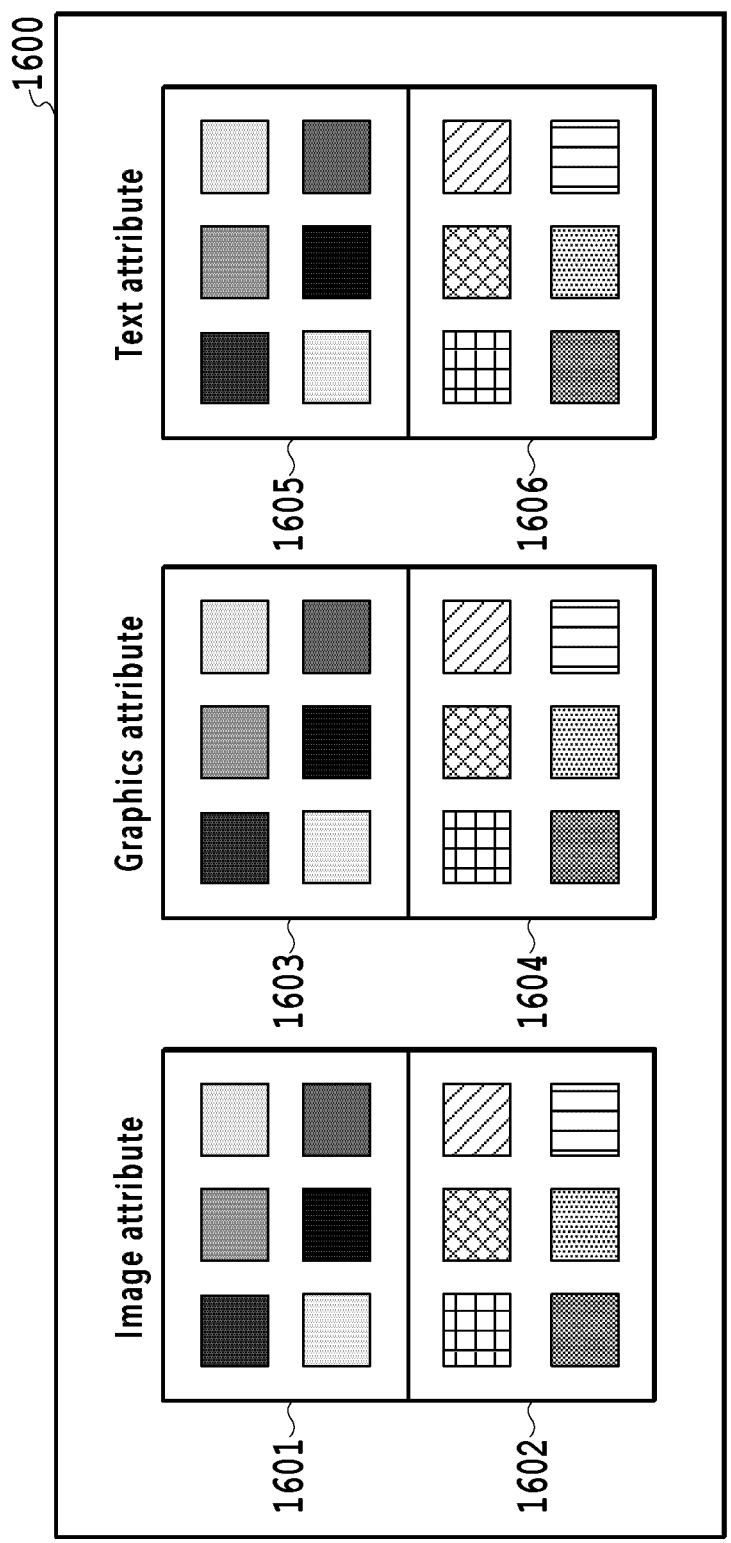
FIG. 16 is a diagram showing an example of an attribute check chart.

Here, the attribute check chart is explained with reference to FIG. 16. An attribute check chart 1600 shown in FIG. 16 is divided into areas for each of the three kinds of object attribute: image attribute, graphics attribute, and text attribute. Then, in the area of the image attribute, a patch group 1601 and a patch group 1602 are included. Similarly, in the area of the graphics attribute, a patch group 1603 and a patch group 1604 are included and in the area of the text attribute, a patch group 1605 and a patch group 1606 are included. Then, in each of the patch groups 1601 to 1606, six primary colors are arranged, respectively, and the patch groups 1601, 1603, and 1605 consist of patches whose density is high and the patch groups 1602, 1604, and 1606 consist of patches whose density is low. The six primary colors are six colors of cyan, magenta, yellow, red, green, and blue. Table 2 below shows color values in the patch whose density is high and Table 3 shows color values in the patch whose density is low.

TABLE 2

Patch whose density is high

| Color | RGB values |
| --- | --- |
| Cyan | (RGB) = (0, 255, 255) |
| Magenta | (RGB) = (255, 0, 255) |
| Yellow | (RGB) = (255, 255, 0) |
| Red | (RGB) = (255, 0, 0) |
| Green | (RGB) = (0, 255, 0) |
| Blue | (RGB) = (0, 0, 255) |

TABLE 3

Patch whose density is low

| Color | RGB values |
| --- | --- |
| Cyan | (RGB) = (0, 128, 128) |
| Magenta | (RGB) = (128, 0, 128) |

TABLE 3-continued

Patch whose density is low

| Color | RGB values |
| --- | --- |
| Yellow | (RGB) = (128, 128, 0) |
| Red | (RGB) = (128, 0, 0) |
| Green | (RGB) = (0, 128, 0) |
| Blue | (RGB) = (0, 0, 128) |

As above, in the attribute check chart, the patch group of the six primary colors whose density is different is arranged for each object attribute. By finding a color difference between the object attributes by reading the dedicated chart such as this, it is possible to determine whether the color processing has been switched for each object attribute in the destination device. Further, by providing two kinds of patch for each color, that is, a dark patch and a pale patch, it is also made possible to determine whether or not the object attributes have different gamma characteristics.

Figure 17:
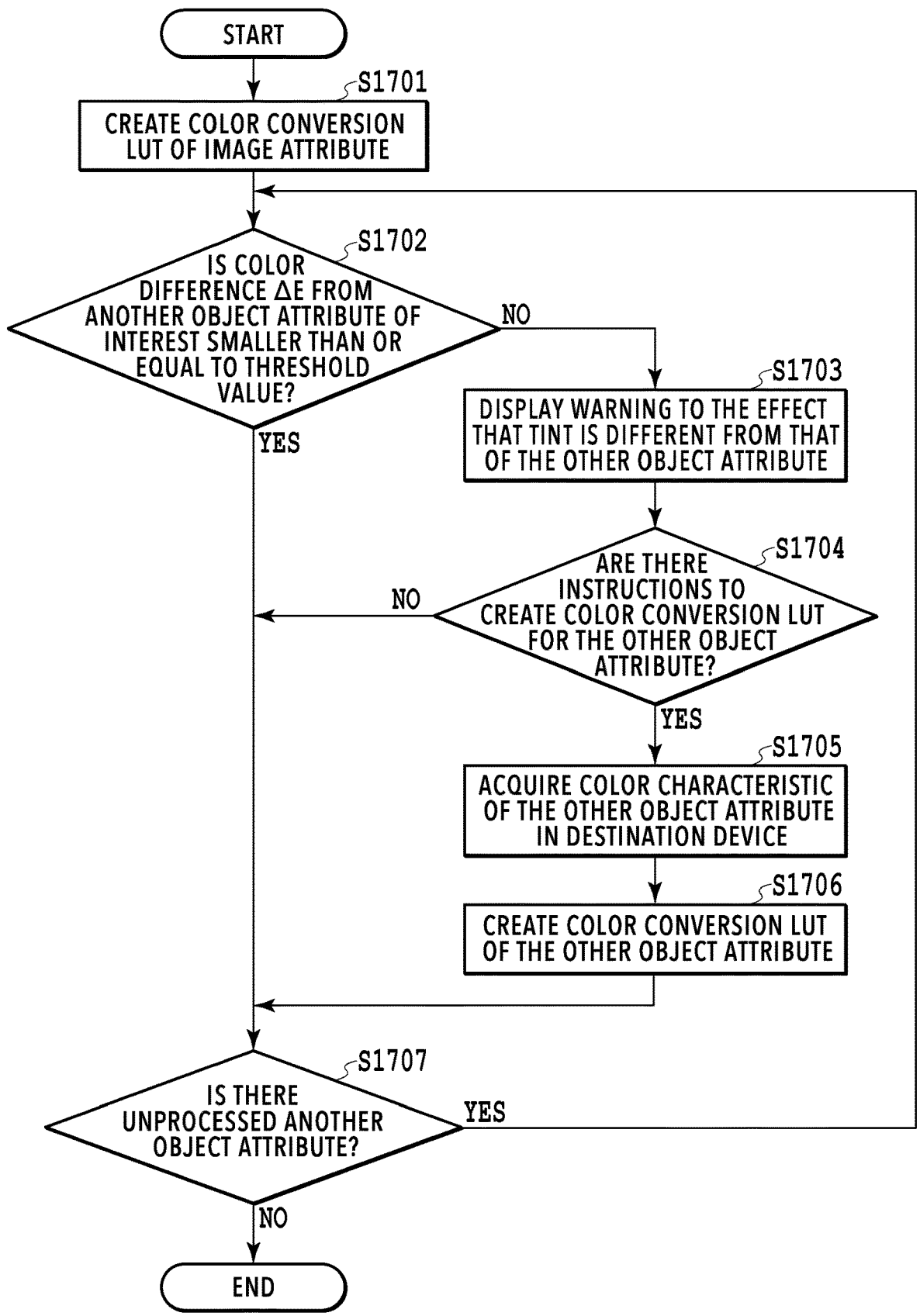
FIG. 17 is a flowchart showing a flow of processing to create a color conversion LUT according to a modification example 3.

FIG. 17 is a flowchart showing a flow of processing to create a color conversion LUT according to the present modification example. In the following, explanation is given along the flow in FIG. 17.

First, at S1701, by using the color characteristic of the reference image attribute and the color characteristic acquired for the adjustment device, a color conversion LUT corresponding to the image attribute is created. In a case of the present modification example, at this point in time, for the object attributes other than the image attribute (that is, the graphics attribute and the text attribute), printing of the target chart is not performed, and therefore, the color characteristic is not acquired. The present modification example differs from the modification example 1 in this point. The creation method of the color conversion LUT is the same as in the case of S808 and S809 described previously, and therefore, explanation thereof is omitted.

At S1702, based on the color characteristic obtained from the above-described attribute check chart, whether or not the color difference between the object attribute of interest, which is one of the other object attributes other than the image attribute, and the image attribute is less than or equal to a threshold value determined in advance is determined. At this time, in a case where, for example, the graphics attribute is taken to be another object attribute of interest, a total of 12 patches included in the patch groups 1601 and 1602 of the image attribute and a total of 12 patches included in the patch groups 1603 and 1604 of the graphics attribute are used. Specifically, it is sufficient to calculate the color difference between the image attribute and the graphics attribute by comparing the L*a*b* values between the patches of the corresponding color (for example, between the patches of dark cyan) and determine whether or not the found color difference is less than or equal to a threshold value determined in advance. Then, in a case where the color difference is less than or equal to the threshold value in all the 12 kinds of patch, the processing advances to S1707 and in a case where there is even one color different among the 12 kinds of patches, which exceeds the threshold value, the processing advances to S1703. This threshold value processing is the same as that at S1402. In a case where the results of the determination indicate that the color difference ΔE exceeds the threshold value determined in advance, the processing advances to S1703 and in a case where it is less than or equal to the threshold value, the processing advances to S1707.

At S1703, a user is notified of a warning to the effect that the tint is different between the reference image attribute and another object attribute of interest. As the aspect of notification, for example, an aspect is considered in which a warning message is displayed on the display unit 105. At S1704 that follows, whether or not instructions to create a color conversion LUT suitable to another object attribute of interest are input via a UI screen, not shown schematically, is determined. In a case where creation instructions by a user are input, the processing advances to S1705 and in a case where there are no such instructions, the processing advances to S1707.

At S1705, the target chart of another object attribute of interest is printed and output in the destination device and the results are read, and thus, the color characteristic of the other object attribute of interest is acquired. Next, at S1706, a color conversion LUT is created by using the color characteristic of another object attribute of interest acquired at S1705. The creation method of the color conversion LUT here is also the same as that in the case of S808 and S809 described previously, and therefore, explanation thereof is omitted.

At S1707, whether the check of whether there is a color difference from the image attribute is performed for all the other object attributes other than the image object is determined. In a case where there is an unprocessed another object attribute, the processing returns to S1702 and the processing is continued and in a case where all the other object attributes have been checked, this processing is terminated.

The above is the flow of the creation of the color conversion LUT according to the present modification example. In a case of the present modification example, for other object attributes other than the reference object attribute, the color characteristic is acquired only in a case where it is necessary, and therefore, the number of target charts that are used is suppressed and it is possible to reduce the cost in terms of time and the economic cost.

Modification Example 4

In the above-described embodiment including each of the modification examples described above, the example is explained in which color adjustment between the destination device and the adjustment device is implemented by the color conversion LUT that converts RGB values into CMYK values, but color adjustment between devices can be performed also by using another printing parameter. For example, it may also be possible to fix the color conversion LUT from RGB into CMYK that is used in the adjustment device and create an LUT for converting RGB into R'G'B' for adjusting the RGB values that are input to the fixed color conversion LUT so that the same color characteristic as that of the destination device is obtained. Alternatively, it may also be possible to create an LUT for converting CMYK into C'M'Y'K' for adjusting the CMYK values that are output from the fixed color conversion LUT. Furthermore, it may also be possible to implement this by a function in place of the LUT format.

As above, according to the present embodiment, the color conversion LUT is created for each object attribute by specifying the configuration of number of color components of gray in the destination device and so on. Due to this, it is possible to match not only the tint of a printed material but also the texture in the adjustment device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to match not only the tint of a printed material but also the texture between different printing devices.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-170576, filed Oct. 8, 2020 which is hereby incorporated by reference wherein in its entirety.

What is claimed is:
1. An image forming apparatus comprising:
a printing unit configured to print an image on a sheet,
a scan unit configured to scan a first sheet on which another image forming apparatus has printed a first object of a gray color and configured to scan a second sheet on which the printing unit has printed a second object;
a determination unit configured to determine a gray characteristic of the first object based on first image data generated by the scan of the first sheet, the gray characteristic indicating whether the gray color of the first object on the scanned first sheet is a gray color represented with only a color material of K (black) or with color materials including a color material of C (cyan), a color material of M (magenta), and a color material of Y (yellow); and
a control unit configured to perform a color matching process, the color matching process being based on the first image data, second image data generated by the scan of the second sheet, and the gray characteristic determined by the determination unit, wherein the color matching process comprises matching between a color characteristic of the printing unit and a color characteristic of the other image forming apparatus.
2. The image forming apparatus according to claim 1, wherein the first object is an object of gray color in which values of each of an R component, a G component, and a B component in a pixel value of a pixel configuring the generated image data are equal, and wherein the determination unit performs the determination based on saturation of a pixel configuring the first object.

3. The image forming apparatus according to claim 2, wherein the determination unit obtains saturation of a pixel configuring the first object and determines that:

the first object on the scanned first sheet has been printed with the color materials including the color material of C, the color material of M, and the color material of Y in a case where a number of pixels having saturation corresponding to a chromatic color is larger than or equal to a predetermined number; and the first object on the scanned first sheet has been printed with only the color material of K in a case where the number of pixels having saturation corresponding to a chromatic color is less than the predetermined number.

4. The image forming apparatus according to claim 2, wherein the determination unit determines that:

the first object on the scanned first sheet has been printed with the color materials including the color material of C, the color material of M, and the color material of Y in a case where a number of pixels whose difference between channels of an R component, a G component, and a B component in a pixel value of a pixel configuring the first object is larger than or equal to a predetermined threshold value is larger than or equal to a predetermined number; and the first object on the scanned first sheet has been printed with only the color material of K in a case where the number of pixels whose difference between the channels is larger than or equal to the predetermined threshold value is less than the predetermined number.

5. The image forming apparatus according to claim 1, wherein the first object is an object of gray color in which values of each of an R component, a G component, and a B component in a pixel value of a pixel configuring the image data are equal, and the determination unit obtains one of an average value, a median, and a standard deviation of each of an R component, a G component, and a B component in the entire gray area and performs the determination based on magnitude of a difference between channels.

6. The image forming apparatus according to claim 1, wherein information used in a color conversion process is generated by performing the color matching process based on the first image data, the second image data and the gray characteristic determined by the determination unit, and wherein, in the color conversion process, a pixel value of a pixel configuring printing-target input image data is converted from an RGB color space into a CMYK color space.

7. The image forming apparatus according to claim 6, wherein the first sheet on which the other image forming apparatus has printed the first object includes a plurality of objects corresponding to each of different object attributes, and the determination unit performs the determination for each of the object attributes.

8. The image forming apparatus according to claim 7, wherein in the different object attributes, at least, an image attribute, a graphics attribute, and a text attribute are included.

9. The image forming apparatus according to claim 7, further comprising:

a registration unit configured to register a combination of the information used in the color conversion process determined for each of the object attributes.

10. A control method of an image forming apparatus having a printing unit configured to print an image on a sheet, the control method comprising the steps of:

scanning a first sheet on which another image forming apparatus has printed a first object of a gray color;

scanning a second sheet on which the printing unit has printed a second object;

determining a gray characteristic of the first object based on first image data generated by the scan of the first sheet, the gray characteristic indicating whether the gray color of the first object on the scanned first sheet is a gray color represented with only a color material of K (black) or with color materials including a color material of C (cyan), a color material of M (magenta), and a color material of Y (yellow); and performing a color matching process, the color matching process being based on the first image data, second image data generated by the scan of the second sheet, and the gray characteristic determined by the determining step, wherein the color matching process comprises matching between a color characteristic of the printing unit and a color characteristic of the other image forming apparatus.

11. A non-transitory computer readable storage medium storing a program for causing a computer to perform a control method of an image forming apparatus having a printing unit configured to print an image on a sheet, the control method comprising the steps of:

scanning a first sheet on which another image forming apparatus has printed a first object of a gray color;

scanning a second sheet on which the printing unit has printed a second object;

determining a gray characteristic of the first object based on first image data generated by the scan of the first sheet, the gray characteristic indicating whether the gray color of the first object on the scanned first sheet is a gray color represented with only a color material of K (black) or with color materials including a color material of C (cyan), a color material of M (magenta), and a color material of Y (yellow); and performing a color matching process, the color matching process being based on the first image data, second image data generated by the scan of the second sheet, and the gray characteristic determined by the determining step, wherein the color matching process comprises matching between a color characteristic of the printing unit and a color characteristic of the other image forming apparatus.

* * * * *